US010175046B1

(12) United States Patent
Biren

(10) Patent No.: US 10,175,046 B1
(45) Date of Patent: Jan. 8, 2019

(54) OPTICAL ACCELEROMETER

(71) Applicant: Marvin A. Biren, Chestnut Hill, MA (US)

(72) Inventor: Marvin A. Biren, Chestnut Hill, MA (US)

( * ) Notice: Subject to any disclaimer, the term of this patent is extended or adjusted under 35 U.S.C. 154(b) by 0 days.

(21) Appl. No.: 15/990,761

(22) Filed: May 28, 2018

Related U.S. Application Data

(62) Division of application No. 15/424,171, filed on Feb. 3, 2017, now Pat. No. 9,983,005.

(60) Provisional application No. 62/291,037, filed on Feb. 4, 2016.

(51) Int. Cl.
*G01C 19/64* (2006.01)
*G01B 9/02* (2006.01)

(52) U.S. Cl.
CPC ............ *G01C 19/64* (2013.01); *G01B 9/02* (2013.01)

(58) Field of Classification Search
CPC .. G01B 9/02; H04B 10/00; G02F 1/00; G01P 15/0802; G01P 3/36; G02B 17/004; G01C 19/64
USPC ...................... 73/488–551; 356/28
See application file for complete search history.

(56) References Cited

U.S. PATENT DOCUMENTS

| | | | |
|---|---|---|---|
| 4,397,027 A * | 8/1983 | Zampiello | H01S 3/083 372/94 |
| 4,428,234 A | 1/1984 | Person | |
| 4,452,531 A | 6/1984 | Person | |
| 4,815,852 A * | 3/1989 | Russell | G01C 19/72 356/470 |
| 6,441,907 B1 * | 8/2002 | Son | G01C 19/66 356/484 |
| 6,813,006 B1 * | 11/2004 | Wang | G01P 3/36 356/28 |
| 7,324,205 B2 * | 1/2008 | Howard | G01B 15/00 356/28.5 |
| 9,110,088 B1 * | 8/2015 | Wright | G01P 3/36 |

OTHER PUBLICATIONS

Barnett et al. (2010) "The Enigma of Optical Momentum in a Medium," Phil. Trans. Royal Society A. 386:927-939.

(Continued)

*Primary Examiner* — Lisa Caputo
*Assistant Examiner* — Nathaniel T Woodward
(74) *Attorney, Agent, or Firm* — Lathrop Gage LLP

(57) ABSTRACT

Methods and apparatus optically measure acceleration, without Sagnac-effect corruption, without requiring slow light and without moving parts. Each optical accelerometer includes at least one measurement cell and at least one reference cell. Two optical signals traverse the cells in opposite directions around a figure-8-configured optical path and then interfere to produce an output signal. The reference cells have different indices of refraction than the measurement cells. Acceleration differentially affects speeds of the optical signals traversing the measurement and reference cells through differentially affecting the indices of refraction of the measurement and reference cells. These differences are evident in changes in the interference in the output signal, thereby enabling measurement of the acceleration. Several embodiments, including optical bench, vertical slab multi-pass, toroidal prism, planar waveguide, cylindrical waveguide, wound waveguide and optical fiber, are described.

19 Claims, 20 Drawing Sheets

(56) References Cited

OTHER PUBLICATIONS

Baxter et al. (2010) "Radiation Pressure and the Photon Momentum in Dielectrics" J. Modern Opt. 57(10):830-842.
Ben-Shimol et al. (1995) "Wave Propagation in Moving Chiral Media: Fizeau's Experiment Revisited," Radio Science. 30(5):1313-1324.
Biren (Jun. 15, 2009) "Mach-Zehnder Optical Interferometer," Draper Laboratory Memorandum. 8 pgs.
Biren (Jun. 2, 2009) "Optical Accelerometer," Draper Laboratory Memorandum. 15 pgs.
Devyatisil'nyi (2004) "Measurement of Linear Accelerations Using Optical Radiation," Measurement Techniques. 47(10):991-993. [Translation from Devyatisil'nyi (2004) Izmeritel'naya Teknika. 10:31-32.].
Fizeau (1851) "On the hypotheses relating to the luminous æther, and an experiment which appears to demonstrate that the motion of bodies alters the velocity with which light propagates itself in their interior," The London, Edinburgh, and Dublin Philosophical Magazine and Journal of Science. Series 4. vol. 2. Issue 14. pp. 568-573.
Frank et al. (2012) "Accelerating medium effect as a general wave phenomenon," Journal of Physics: Conference Series. 340:012042. pp. 1-11.
Frisch (1965) "Take a Photon . . . ," Contemp. Phys. 7:45-63.
Hoek (1868) "Determination of the Speed with which a Light Wave is Entrained Crossing a Moving Medium," Extract from "Determination de la vitesse avec laquelle est entrainée une onde lumineuse traversant un milieu en mouvement," Verslagen en Mededeelingen der Konikl. Akademy van Weienschappen. 2nd Series. T, II, pp. 189-194.
Kelleher (Aug. 10, 2009) "A Model for Light Propagation and Effects of Acceleration and Velocity in a Moving Dielectric," E-Mail Attachment from W. Kelleher Sent to M. Biren.
Kolyada et al. (2001) "Measurement of Absolute Acceleration With the Use of Light Radiation" Measurement Techniques. 44(4):382-386. [Translation from Kolyada et al. (2001) Izmeritel'naya Teknika. 4:33-35.].
Lerche (1977) "The Fizeau Effect: Theory, experiment, and Zeeman's Measurements," American Journal of Physics. 45(12)1154-1163.
Loudon et al. (2005) "Radiation Pressure and Momentum Transfer in Dielectrics: The Photon Drag Effect," Physical Review A. 71:063802. pp. 1-11.
Loudon et al. (2006) "Theory of the Radiation Pressure on Dielectric Slabs, Prisms, and Single Surfaces," Optics Express. 14(24):11855-11869.
Malykin (2000) "The Sagnac Effect, Correct and Incorrect Explanations," Physics-Uspekhi. 43(12):1229-1252.
Mansuripur (2002) "Doppler Shift, Stellar Aberration, and Convection of Light by Moving Media" Optics & Photonics News. Apr. 2002, pp. 52-56.
Mansuripur (2007) "Radiation Pressure and the Linear Momentum of the Electromagnetic Field in Magnetic Media" Optics Express. 15(21):13502-13518.
Nieutze (1998) "Acceleration and Optical Interferometry," Doctoral Thesis, University of Canterbury. pp. 1-192.
Nieutze et al. (1998) "Detecting the Effects of Linear Acceleration on the Optical Response of Matter," Phys. Rev. A. 58(1):82-90.
Post (1972) "Interferometric Path-Length Changes Due to Motion," Journal of the Optical Society of America. 62 (2):234-239.
Post (967) "Sagnac Effect," Review of Modern Physics. 39(2):475-493.
Sanders et al. (1988) "Measurement of Fresnel Drag in Moving Media Using a Ring Resonator Technique" J. Opt. Soc. Am. B. 5(3):674-678.
Stedman (1977) "Ring-laser Tests of Fundamental Physics and Geophysics," Rep. Prog. Phys. 60:615-688.
Tanaka et al. (1978) "Relativistic Study of Electromagnetic Waves in the Accelerated Dielectric Medium," J. Appl. Phys. 48(8):4311-4319.
Wang et al. (2003) "Modified Sagnac Experiment for Measuring Travel-Time Difference Between Counter-Propagating Light Beams in a Uniformly Moving Fiber," Physics Letters A. 312:7-10.
Welling (Oct. 16, 2000) "IFOG Signal Processing Tutorial," Draper Laboratory Memorandum. 12 pgs.
wikipedia.com (Last Updated on Sep. 21, 2017) "Velocity Addition Formula," Wikimedia Foundation, Inc. Accessible on the Internet at URL: http://en.wikipedia.org/wiki/Velocity-addition_formula. [Last Accessed Oct. 19, 2017].

\* cited by examiner

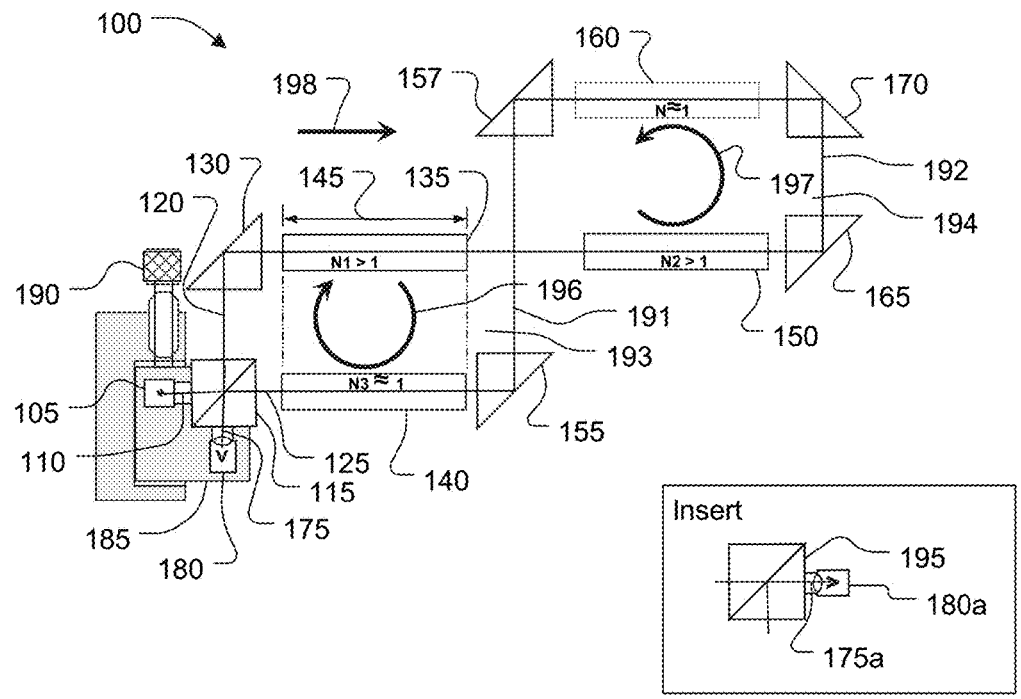
*Fig. 1*
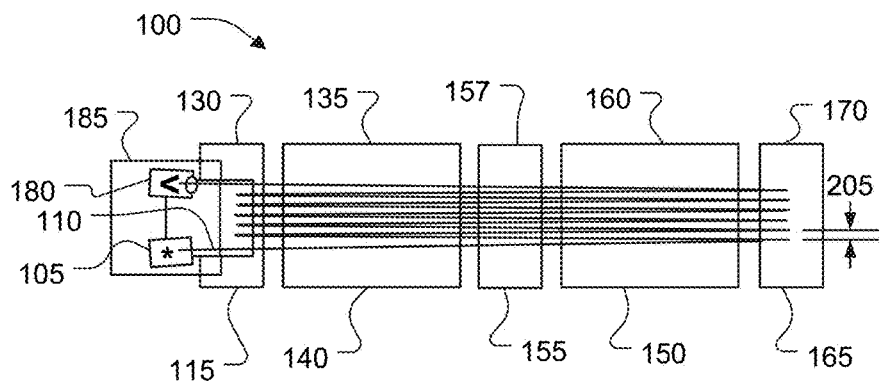
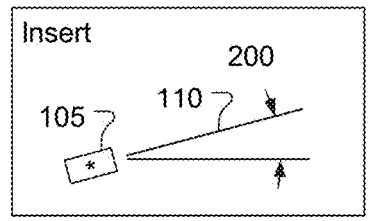
*Fig. 2*

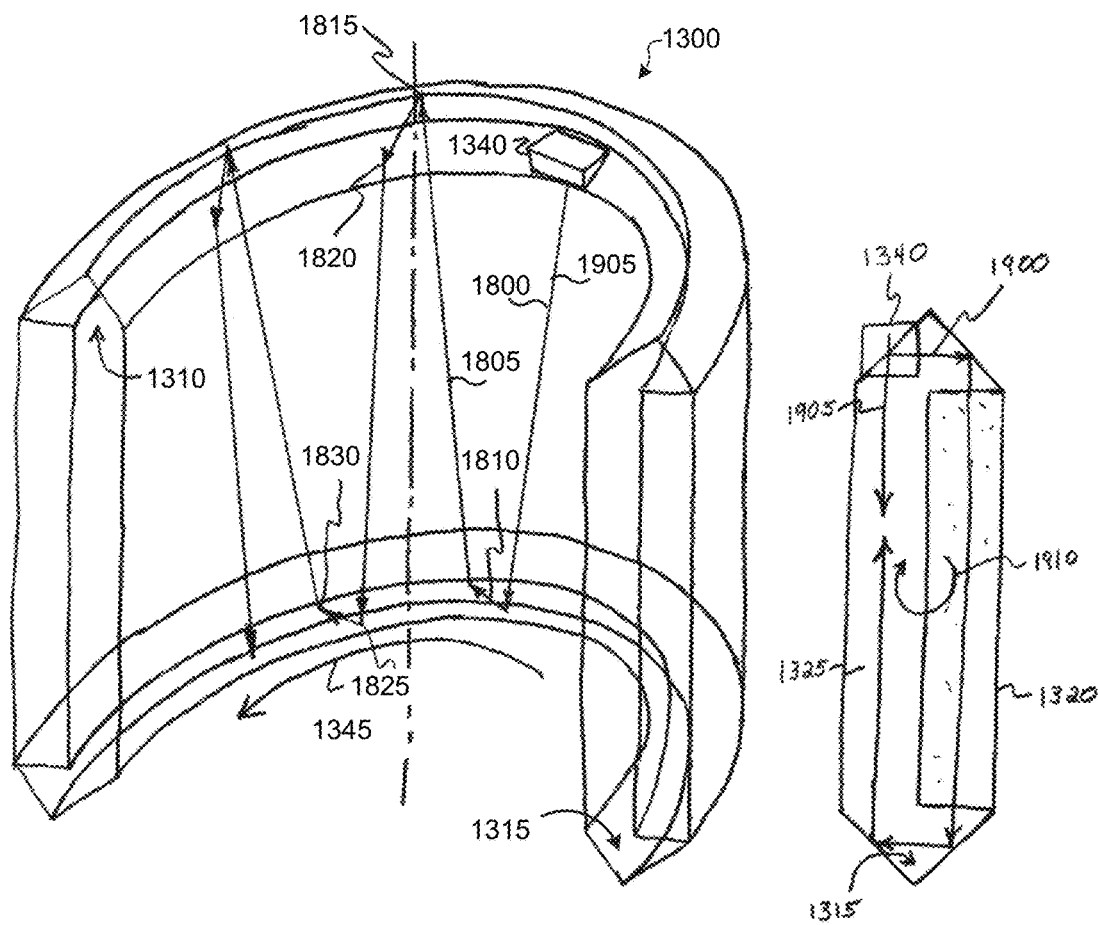
*Fig. 18*  *Fig. 19*

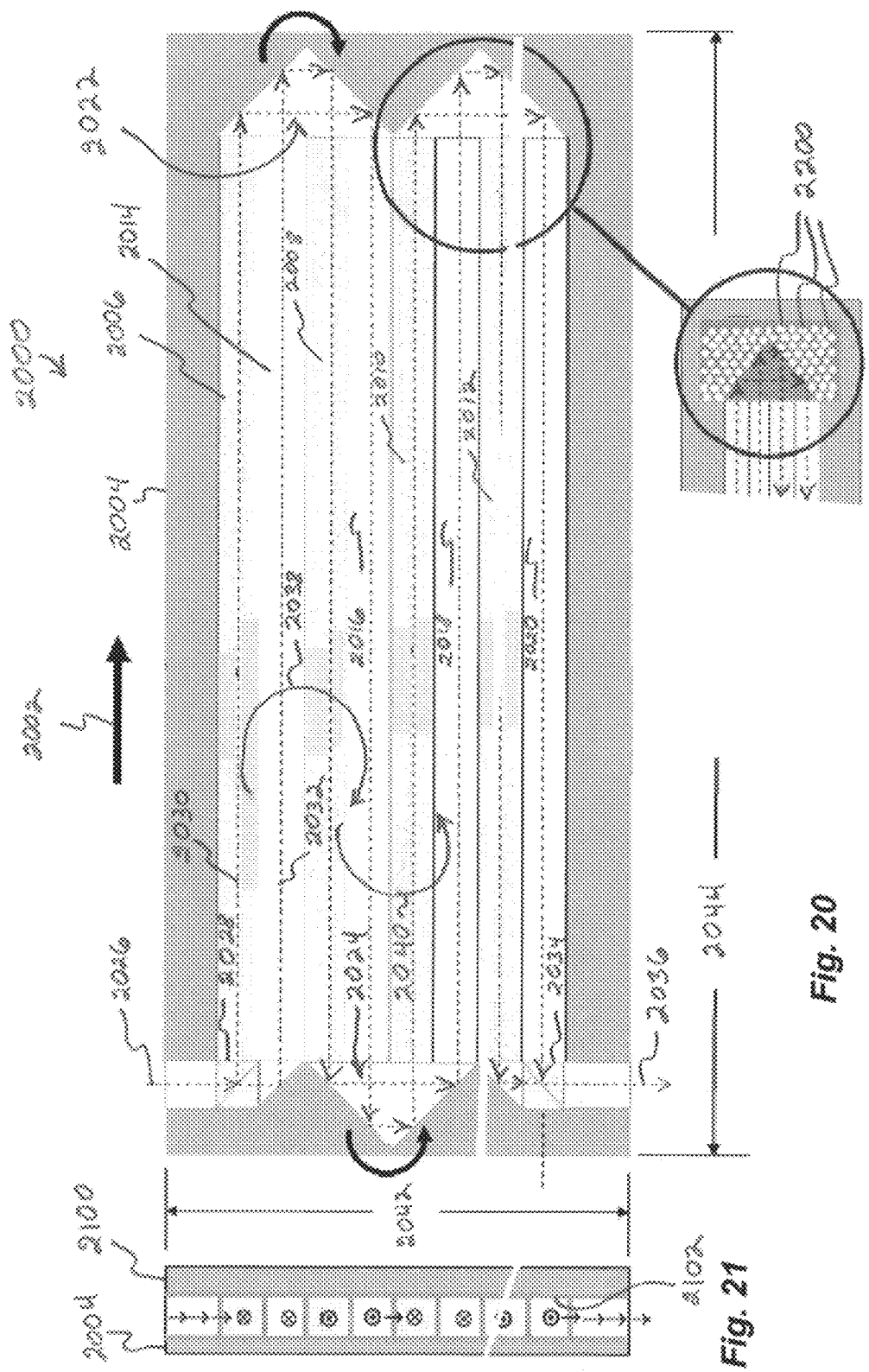

OPTICAL ACCELEROMETER

CROSS-REFERENCE TO RELATED APPLICATIONS

This application is a divisional application of U.S. patent application Ser. No. 15/424,171 filed Feb. 3, 2017, which claims the benefit of U.S. Provisional Application No. 62/291,037, filed Feb. 4, 2016, each of which is hereby incorporated by reference in its entirety.

BACKGROUND

Conventional accelerometers contain moving parts and detect specific forces to ascertain acceleration. For example, a pendulous integrating gyroscopic accelerometer (PIGA) includes a spinning gyroscope and a pendulous mass mounted on a bearing. A spring-mass accelerometer employs a proof mass suspended within a frame by one or more springs and measures displacement of the proof mass, relative to the frame, as a result of acceleration. Moving parts make such conventional accelerometers difficult to manufacture and subject to mechanical wear.

U.S. Pat. No. 7,324,205 to Robert J. Howard ("Howard") discloses a device, said to be an optical accelerometer, gravitometer and gradiometer. However, Howard's device requires "slow light," i.e., light that travels at significantly less than c, the speed of light in a vacuum. Slow light may result from light passing through a medium that has been cooled to near absolute zero to produce a Bose-Einstein condensate (BEC), which causes electromagnetically-induced transparency (EIT) of an ordinarily opaque material. Howard's device requires cumbersome apparatus to produce slow light. Furthermore, Howard's device is subject to Sagnac-effect corruption.

In his 1868 paper "Determination de la vitesse avec laquelle est entraînée une onde lumineuse traversant un milieu en movement" ("Determination of the Speed with which a Light Wave is Entrained Crossing a Moving Medium"), Martin (also Martinus) Hoek ("Hoek") disclosed an unbalanced interferometer.

U.S. Pat. No. 6,813,006 to Ruyong Wang, et al. ("Wang") improves on the Hoek device and discloses an optical device said to measure speed of an object by detecting interference between two electromagnetic beams that pass through two media having different dispersive dragging effects on the beams. However, Wang's description of his device as a "velocimeter" is believed to be incorrect, as his device is not sensitive to velocity. Instead, Wang's device is sensitive to acceleration, i.e., change in velocity between successive inertial velocity states.

SUMMARY OF EMBODIMENTS

An embodiment of the present invention provides an optical accelerometer. The optical accelerometer has an input measurement axis.

The optical accelerometer includes first and second counterfacing elongated retroreflectors. The retroreflectors have parallel respective length axes. The retroreflectors define a first optical circuit between the first and second retroreflectors. The first optical circuit bounds a first area, as seen in a top view. The first optical circuit includes parallel first and second legs. The first and second legs extend between the first and second retroreflectors.

The optical accelerometer also includes a beam splitter. The beam splitter is positioned to divide an optical beam into first and second beams. The beam splitter is also positioned to introduce the first and second beams into the first optical circuit at respective first and second angles to the length axis of the first retroreflector. The first and second angles are other than perpendicular. The first and second beams traverse the first optical circuit in opposite directions, as seen in the top view. The first and second beams traverse the first optical circuit along respective rectangular helical paths. Each helical path includes a plurality of loops.

The optical accelerometer also includes third and fourth counterfacing elongated retroreflectors. The third and fourth retroreflectors have respective length axes. The length axes of the third and fourth retroreflectors are parallel to the length axis of the first retroreflector. The third and fourth retroreflectors define a second optical circuit between the third and fourth retroreflectors. The second optical circuit bounds a second area, as seen in a top view. The second area is equal in size to the first area. The second optical circuit includes third and fourth legs. The third and fourth legs extend between the third and fourth retroreflectors. The third and fourth legs extend parallel to the first leg.

The optical accelerometer also includes a first stack coupling mirror. The first stack coupling mirror is disposed in the first leg to reflect the first beam toward and into the second optical circuit. The first beam traverses the first and second optical circuits in opposite directions, as seen in the top view.

The optical accelerometer also includes a second stack coupling mirror. The second stack coupling mirror is disposed in the second leg to reflect the second beam toward and into the second optical circuit. The second beam traverses the first and second optical circuits in opposite directions, as seen in the top view.

The optical accelerometer also includes first and second optical media. The first and second optical media have substantially equal refractive indices. The first and second optical media have substantially equal lengths. The first and second optical media are disposed, respectively, in the first and second optical circuits. The first beam traverses both optical media in equal directions. The first beam traverses both optical media parallel to the input measurement axis. The first and second beams traverse each of the optical media in opposite directions, as seen in the top view.

The optical accelerometer also includes third and fourth optical media. The third and fourth optical media have substantially equal refractive indices. The refractive indices of the third and fourth optical media are different from the refractive indices of the first and second optical media. The third and fourth optical media are disposed, respectively, in the first and second optical circuits. The first beam traverses the first optical medium and the third optical medium in opposite directions. The first beam traverses the second optical medium and the fourth optical medium in opposite directions.

The optical accelerometer also includes a beam combiner. The beam combiner is positioned to combine the first and second beams. The beam combiner is positioned to generate an output signal from interference between the first and second beams, after the first and second beams have traversed the plurality of loops.

The refractive index of each of the first and second optical media may be at least about 1.3. The refractive index of each of the third and fourth optical media may be at most about 1.002.

The first optical medium may include glass. The second optical medium may include glass. The third optical medium may include a first chamber containing a medium. The medium may be air, vacuum or at least 99% nitrogen. The fourth optical medium may include a second chamber containing a medium as selected for the first chamber.

The first optical medium may include a first right rectangular prism. The second optical medium may include a second right rectangular prism.

The beam combiner may be optically coupled to the second optical circuit at a far point, along the first and second optical circuits, from the beam splitter.

The optical accelerometer may also include a first reversing mirror. The first reversing mirror may be disposed in the second optical circuit at an angle complementary to the first angle, relative to the length axis of the first retroreflector, to reflect the first beam. A second reversing mirror may be disposed in the second optical circuit at an angle complementary to the second angle, relative to the length axis of the first retroreflector, to reflect the second beam. The beam splitter may include the beam combiner.

Another embodiment of the present invention provides an optical accelerometer. The optical accelerometer has an input measurement axis.

The optical accelerometer includes first and second counterfacing toroidal retroreflectors. The first and second counterfacing toroidal retroreflectors have their toroidal centers disposed on the input measurement axis.

The optical accelerometer also includes a first toroidal optical medium. The first toroidal optical medium has a first refractive index. The first toroidal optical medium is disposed between the first and second counterfacing toroidal retroreflectors. The first toroidal optical medium is disposed coaxial with the input measurement axis.

The optical accelerometer also includes a second toroidal optical medium. The second toroidal optical medium has a second refractive index. The second refractive index is different from the first refractive index. The second refractive index is disposed between the first and second counterfacing toroidal retroreflectors. The second refractive index is disposed coaxial with the input measurement axis.

The first and second counterfacing toroidal retroreflectors and the first and second optical media define a first optical path extending from the first retroreflector, through the first optical medium, to the second retroreflector. The first and second counterfacing toroidal retroreflectors and the first and second optical media define a second parallel optical path from the first retroreflector, through the second optical medium, to the second retroreflector. The first optical path and the second parallel optical path have substantially equal lengths.

The optical accelerometer also includes a beam splitter. The beam splitter is positioned to divide an optical beam into first and second beams. The beam splitter is positioned to introduce the first and second beams, respectively, into the first and second optical paths not parallel to the input measurement axis. Consequently, the first and second beams alternatingly reflect from the first and second counterfacing toroidal retroreflectors at progressive circumferential locations along each of the first and second retroreflectors. The first and second beams alternatingly traverse the first and second optical media. The first and second beams traverse the first optical medium in opposite directions.

The optical accelerometer also includes a beam combiner. The beam combiner is positioned to combine the first and second beams. The beam combiner is positioned to generate an output signal from interference between the first and second beams after the first and second beams have traversed each of the first and second optical media a plurality of times.

The first refractive index may be at least about 1.3. The second refractive index may be at most about 1.002.

The optical accelerometer may also include a reversing mirror.

The beam splitter may include the beam combiner.

The optical accelerometer may also include an electronic circuit. The electronic circuit may be disposed within a minor diameter of the second toroidal optical medium. The electronic circuit may be coupled to receive the output signal. The electronic circuit may be coupled to generate an acceleration signal based on the output signal.

Yet another embodiment of the present invention provides a method for manufacturing optical fiber. The method includes providing zero-area Sagnac rotation compensation. The method further includes irradiating the optical fiber intermittently along its length with one or a plurality of irradiation wavelengths. In an embodiment of this method, the step of providing a zero-area Sagnac rotation compensation includes winding the optical fiber in a first winding direction; and includes winding the optical fiber in a second winding direction, to form first and second half-winding pairs, whereby the first and second half-winding pairs are capable of conducting a light beam in first and second directions, respectively, and opposite each other, relative to an input axis. In an embodiment of this method, the step of irradiating the optical fiber includes irradiating with a plurality of irradiation intensities. In an embodiment of this method, the step of intermittently irradiating the optical fiber includes using one or more lasers. In an embodiment of this method, the optical fiber comprises fiber with a plurality of indices of refraction along its length. In an embodiment of this method, the optical fiber comprises at least one double-clad long-period fiber Bragg grating.

BRIEF DESCRIPTION OF THE DRAWINGS

The invention will be more fully understood by referring to the following Detailed Description of Specific Embodiments in conjunction with the Drawings, of which:

FIGS. 1 and 2 are respective top and side schematic diagrams of an optical bench optical accelerometer interferometer arrangement, according to an embodiment of the present invention.

FIGS. 18 and 19 are cut-away view of the toroidal optical accelerometer, similar to FIGS. 16 and 17, schematically illustrating paths taken by portions of two beams, according to an embodiment of the present invention.

FIGS. 20 and 21 are respective plan and left side schematic diagrams of a planar waveguide optical accelerometer, according to another embodiment of the present invention.

FIG. 22 includes a plan view of a portion of the planar waveguide optical accelerometer of FIGS. 20 and 21, according to an alternative embodiment of the present invention.

DETAILED DESCRIPTION OF SPECIFIC EMBODIMENTS

Figure 3:
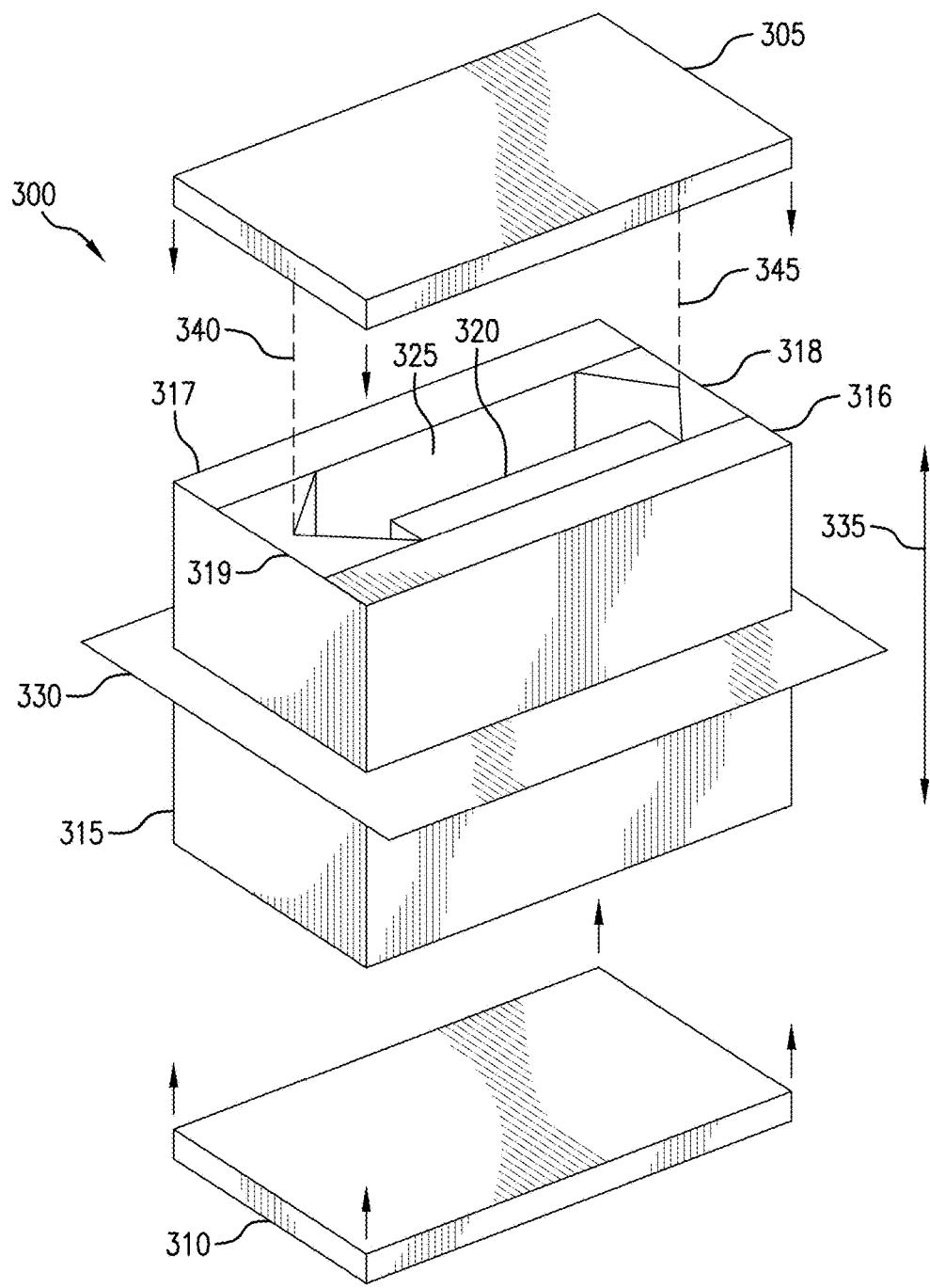
FIG. 3 is an exploded perspective-view schematic diagram of one element of a vertical slab multi-pass optical accelerometer, according to an embodiment of the present invention.

FIGS. 1 and 2 are respective top and side schematic diagrams of an optical bench optical accelerometer 100, arranged according to an embodiment of the present invention. The optical accelerometer 100 includes a special case interferometer. Embodiments of the present invention operate according to principles that will be explained using FIGS. 1 and 2. The optical accelerometer 100 includes a light source 105. The light source 105 can emit any suitable electromagnetic radiation, such as visible or invisible, such as infrared, light. For example, the light source 105 may be a laser that emits light having a wavelength of about 1,550 nm. A light beam 110 emitted by the light source 105 enters a first beam splitter 115, where the beam 110 is split into a first beam 120 and a second beam 125.

The first beam 120 is reflected by a first mirror 130. The first beam 120 then traverses a first optical medium 135. The first optical medium 135 has an index of refraction (N1) greater than 1. For example, the first optical medium 135 may include a high-quality optical glass having an index of refraction of about 1.3, 1.4 or 1.46. Other optical media having other indices of refraction are acceptable.

The second beam 125 traverses a third optical medium 140, such as a partial or complete vacuum, air or dry nitrogen, having an index of refraction (N3) different from the index of refraction of the first optical medium 135 (N1). The third optical medium 140 may be confined within a sealed chamber. In the example depicted in FIG. 1, the index of refraction of the third optical medium 140 is about 1. Gain of the optical accelerometer 100 depends in part on a difference between the index of refraction of the first optical medium 135 and the index of refraction of the third optical medium 140, with a larger difference providing greater gain.

A path taken by the first beam 120 through the first optical medium 135 should be at least as long 145 as a path taken by the second beam 125 through the third optical medium 140. In the embodiment shown in FIG. 1, the paths taken through the first and third optical media 135 and 140, respectively, are substantially equal in length. As used herein, "substantially equal" lengths means the lengths do not differ by more than a relatively small fraction of a wavelength of the first and second beams 120 and 125, such that any such difference does not contribute to more than about a few percent error.

After exiting the first optical medium 135, the first beam 120 traverses a second optical medium 150. The second optical medium 150 has an index of refraction (N2) greater than 1. The index of refraction of the second optical medium 150 (N2) can, but need not, be the same as the index of refraction of the first optical medium 135 (N1). The second optical medium 150 can, but need not, be made of the same material as the first optical medium 135. The second optical medium 150 may include a high-quality optical glass having an index of refraction of about 1.3, 1.4 or 1.46. Other optical media having other indices of refraction are acceptable.

The first beam traverses both the first and the second optical media 135 and 150 in equal directions. "Equal directions" means the directions are parallel, although not necessarily collinear, and not opposite. As used herein, "equal directions" has a meaning similar to equal directions, as used to refer to equal direction vectors. In the example of FIG. 1, the beams through the first and second optical media 135 and 150 are also collinear.

After exiting the third optical medium 140, the second beam 125 is reflected by a second mirror 155 and a third mirror 157, and then the second beam 125 traverses a fourth optical medium 160. The fourth optical medium 160 has an index of refraction different from the index of refraction of the second optical medium 150. The fourth optical medium 160 can, but need not, be the same material as in the third optical medium 140. In the example depicted in FIG. 1, the index of refraction of the fourth optical medium 160 is about 1. The second beam 125 traverses the third and fourth optical media 140 and 160 in equal directions. Gain of the optical accelerometer 100 depends in part on a difference between the index of refraction of the second optical medium 150 and the index of refraction of the fourth optical medium 160, with a larger difference providing greater gain.

A path taken by the first beam 120 through the second optical medium 150 should be at least as long as a path taken by the second beam 125 through the fourth optical medium 160. In the embodiment shown in FIG. 1, the paths taken through the second and fourth optical media 150 and 160, respectively, are substantially equal in length.

Collectively, fourth and fifth mirrors 165 and 170 couple the paths taken thus far by the first and second beams 120 and 125 to each other, so the first beam 120 now follows the path of the second beam 125, but in reverse, and the second beam 125 now follows the path of the first beam 120, but in reverse, back to the beam splitter 115.

In a simplified version of the optical accelerometer 100 shown in FIG. 1, the beam splitter 115 combines the first and second beams 120 and 125 to provide an output signal 175. A difference in path lengths followed by the first and second beams 120 and 125 produces interference when the beam splitter 115 combines the two beams 120 and 125. This interference can be measured by a suitable sensor 180, such as an optical sensor, in a Sagnac configuration.

Alternatively, one of the mirrors 165 or 170 may be replaced by a beam combiner 195, shown in an insert in FIG.

1, in which case an output signal 175a is provided by the beam combiner 195 to a sensor 180a in a Mach-Zehnder configuration.

The overall path lengths of the first and second beams 120 and 125 from the beam splitter 115, through the optical media 135, 140, 150 and 160, and back to the beam splitter 115 (or alternatively to the beam combiner 195) should be equal. As a practical matter, it may be impossible to initially position the above-described components of the optical accelerometer 100 such that the path lengths are identical. Therefore, the light source 105, the beam splitter 115 and the sensor 180 may be mounted on a table 185 that is moveable, relative to the other components, and a zero-adjustment screw 190 may be used to adjust the position of the table 185 vertically (as viewed in FIG. 1) to compensate for the path length difference. Alternately, any apparent path length difference with no acceleration input may be compensated for by adjusting electronics subsequent to the sensor 180 or 180a.

As noted, FIG. 2 is a side view of the optical accelerometer 100 of FIG. 1. The boresight axis of the light source 105 is tilted at an angle, other than zero relative to horizontal. Therefore, the light beam 110 enters the first beam splitter 115 at an angle, and the first and second beams 120 and 125 travel at angles until they reach the mirrors 165 and 170. One or both of the mirrors 165 and 170 are tilted by an angle, so the return paths of the light beams 120 and 125 are also tilted. Therefore, the first and second beams 120 and 125 travel along essentially spiral paths, from the viewpoint of FIG. 2, up in the example of FIG. 2, until they are combined by the beam splitter 115 (or by the combiner 195 of the insert of FIG. 1). The boresight axis of the sensor 180 or 180a is tilted at an angle opposite to the angle of the light source 105.

The first beam 120 travels from the first beam splitter 115 to the first mirror 130, through second mirrors 157 and 155 and through the third optical medium 140 in a generally clockwise direction, as indicated by an arrow 196. These four legs collectively comprise a first optical circuit 191. After passing through optical medium 135, the first beam 120 continues through the second optical medium 150, the mirrors 165 and 170, the fourth optical medium 160 and completes the upper half of the path between the third and second mirrors 157 and 155 in a generally counterclockwise direction, as indicated by an arrow 197. These four legs collectively comprise a second optical circuit 192.

The first optical circuit 191 bounds an area 193, as seen in the top view of FIG. 1. The second optical circuit 192 bounds an area 194, as seen in top view of FIG. 1. In a perfectly constructed or adjusted device, the area 193 bounded by the first optical circuit is equal to the area 194 bounded by the second optical circuit, the path length of the first optical circuit 191 is equal to the path length of the second optical circuit 102 and the first beam 120 traverses the first and second optical circuits 191 and 192, respectively, in clockwise and counterclockwise directions. Similarly, the second beam 125 traverses the first and second optical circuits 191 and 192, respectively, in counterclockwise and clockwise directions. The first and second beams 120 and 125 each traverse each of the respective optical circuits 191 and 192 in opposite directions. The two optical circuits 191 and 192 effectively form a figure-8 configuration for each of the beams 120 and 125. This arrangement cancels any Sagnac effect on the beams 120 and 125 due to rotation of the device 100 in the inertial frame.

The optical media 135, 140, 150 and 160 are oriented parallel to an input measurement axis 198. The direction of travel of the first beam 120 through the first and second optical media 135 and 150 is in the same direction as, or at least parallel to, the input measurement axis 198. Similarly, the direction of travel of the second beam 125 through the third and fourth optical media 140 and 160 is in the same direction as, or at least parallel to, the input measurement axis 198. The first and second optical media 135 and 150 are referred to herein as "measurement cells," and the third and fourth optical media 140 and 160 are referred to herein as "reference cells." The first optical circuit 191 includes a measurement cell and a reference call, and the second optical circuit 192 includes a measurement cell and a reference cell.

In operation, the optical accelerometer 100 is initially placed in a local inertial frame with $V_0$ equal to a constant (e.g., measurement axis 198 is aligned horizontally, and alternately East and West) and the path length of one optical circuit is adjusted by the zero-adjustment screw 190, so that the resultant interference pattern measured by the sensor 180 or 180a is nulled. Although the effect on Sagnac-effect cancellation is minimal when initially zeroing the interference pattern, additional zeroing procedures, zero-adjustment mechanisms or electrical compensation circuits may be added as desired to further improve accuracy, as is common practice in the inertial component art. When the device is accelerated, so that the velocity changes ($V_1 \neq V_0$), the increase in kinetic energy of the device 100 causes an unequal change in the refractive indices of the measurement and reference cells (optical media 135, 150, 140 and 160, respectively). If the medium in the reference cells (optical media 140 and 160) is vacuum, their refractive indices remain constant ($n_r=1$) and unaffected by the change in velocity of the device 100. During acceleration between $V_0$ and $V_1$, the frequencies of the first beam 120 passing through the measurement cells 135 and 150 and of the second beam 125 passing through the reference cells 140 and 160 changes, one increasing, and the other decreasing. The resultant beat frequency between them is a measure of the acceleration along the measurement axis 198, a=(dV/dt)• (IA), where an underline indicates a vector quantity, and the dot indicates a vector dot product. While the acceleration continues, the beat frequency integrates into a phase shift between beams 120 and 125. After the acceleration stops, the change in the interference pattern due to the integrated phase change during acceleration is a permanent measure of the change in velocity (integrated acceleration), $\Delta V=(V_1-V_0)$•(IA) since nulling at $V_0$ (launch time).

The Fizeau Effect (Hippolyte Fizeau, 1851) is a demonstration that the speed of light in a moving medium is different from the speed of light in a stationary medium, although Fizeau's conclusion (that the luminiferous aether was dragged by the moving medium, thereby verifying existence of the aether) is incorrect. The optical accelerometer 100 directly detects a change in velocity by a shift in fringes of the interference pattern, as seen by the detector 180 or 180a. The shift in the fringes results from the first and second beams 120 and 125 being differently affected by the change in velocity, as they pass through the optical media 135/150 and 140/160, which have different indices of refraction. The effect is due to acceleration of a dielectric (the first and second optical media 135 and 150) in space-time affecting interchange of energy between photons of the light beams and atoms of the dielectric medium, effectively changing the dielectric constant in the direction of acceleration 198.

Photons passing through a transparent dielectric medium mostly travel through vacuum between atoms, with occasional interaction with the atoms of the dielectric. In a constant velocity inertial frame, the momentum exchange with the atoms of the dielectric gives rise to phase and phase velocity changes characterized by the parameters known as dielectric constant and index of refraction of the material. An accelerating transparent dielectric transfers additional momentum to the electromagnetic field of the photon wave packet over that which is transferred at constant velocity. This changes the photon's phase and frequency from what it would be in a non-accelerating inertial frame. The integrated effect over the photon beam's path through the medium is a change in its instantaneous phase velocity through the dielectric, which is equivalent to a change in the index of refraction of the medium.

When the acceleration stops, the beam frequency within the medium returns to its original value, but the integrated change in frequency remains as a permanent change in phase and is a measure of the integrated acceleration, $\Delta V$, from the (arbitrary) steady-state velocity of the original inertial frame to the new steady-state velocity (arbitrary+$\Delta V$) of the new inertial frame.

The optical media 140 and 160 have indices of refraction equal, or close, to 1 and are not, therefore, affected by any acceleration or are affected to only a small degree. The vacuum wavelength, initial length of the measurement cell and measured phase difference under acceleration are all scalars and invariant to Lorenz transformation back to the launch coordinate system within which the vehicle trajectory is calculated. The system is ratiometric and does not require synchronization of any clocks. The effect of using air or another dielectric of small index for the reference cell instead of vacuum decreases the magnitude of the effect, i.e., scale factor, but not significantly.

Acceleration measured by the optical accelerometer 100 is over and above any true Doppler frequency effects due to a differential velocity between the photon source 105 and detector 180 or 180a during the passage of the photons during the acceleration period. These, and any related frequency shifts at interfaces between areas of different indices of refraction, cancel out in a properly designed interferometer. The moving system clock frequency also changes by a time dilation of the whole process, but this is taken into account by the Lorenz transformations of the photon transit velocity.

The device 100 can operate in either a frequency-tracking accelerometer mode, analogous to an interferometric fiber-optic gyroscope (IFOG), or in an integrated $\Delta$-velocity mode, analogous to an integrating gyroscopic accelerometer (PIGA). If adequate separation is provided between adjacent narrow beams on successive passes around the loops, which are in a figure-8 configuration ("figure-8 loops"), in the same direction to avoid mode locking, such as sufficiently tilting the plane of the beams as in FIG. 2, the device 100 operates in the integrated $\Delta$-velocity mode, and successive passes provide increased effective path length and sensitivity. Alternately, if a wide beam floods the measurement and reference cells 135, 150, 140 and 160, the device 100 operates in the frequency-tracking accelerometer mode, as an etalon, with interference between successive passes narrowing the output beam bandwidth, increasing the ability to discriminate differences in frequency, but with no increase in effective path length on successive passes. In this case, $\Delta$-velocity integration may most easily be accomplished in instrument electronics, as in an IFOG. Mode locking between counter-propagating beams may need to be handled as in IFOGs. Dynamic polarization effects may need to be taken into account as well. The light source 105 and sensor 180 or 180a may be conventionally fabricated, as for an IFOG, such as in an integrated optical chip (IOC) using serrodyne modulation. A low coefficient of thermal expansion material, such as Zerodur® glass, available from Schott AG, Mainz, Germany, may be used to fabricate components and/or a base for the components of the optical accelerometer 100.

FIG. 3 is an exploded perspective schematic diagram of one element 300 of a vertical slab multi-pass optical accelerometer, according to an embodiment of the present invention. The vertical slab multi-pass optical accelerometer includes a special case interferometer. The vertical slab multi-pass optical accelerometer includes two or more such elements 300, although some of the elements are mirror images of the element 300 depicted in FIG. 3, as described in more detail herein. Each element 300 may be made of any suitable material, such as a low coefficient of thermal expansion material, such as Zerodur® glass.

The element 300 includes a top 305, a bottom 310 and a body 315. The body 315 includes a first optical medium 320. The first optical medium 320 may be in the form of a first right rectangular prism. The top, bottom and body 300-310 define a void 325 that may be filled with a third optical medium, such as air, dry nitrogen or a liquid, or the void 325 may be partially or completely evacuated. The index of refraction of the first optical medium 320 is different from the index of refraction of the third optical medium. The first optical medium 320 forms a measurement cell, and the third optical medium forms a reference cell, as described with respect to the embodiment of FIGS. 1-2.

Figure 4:
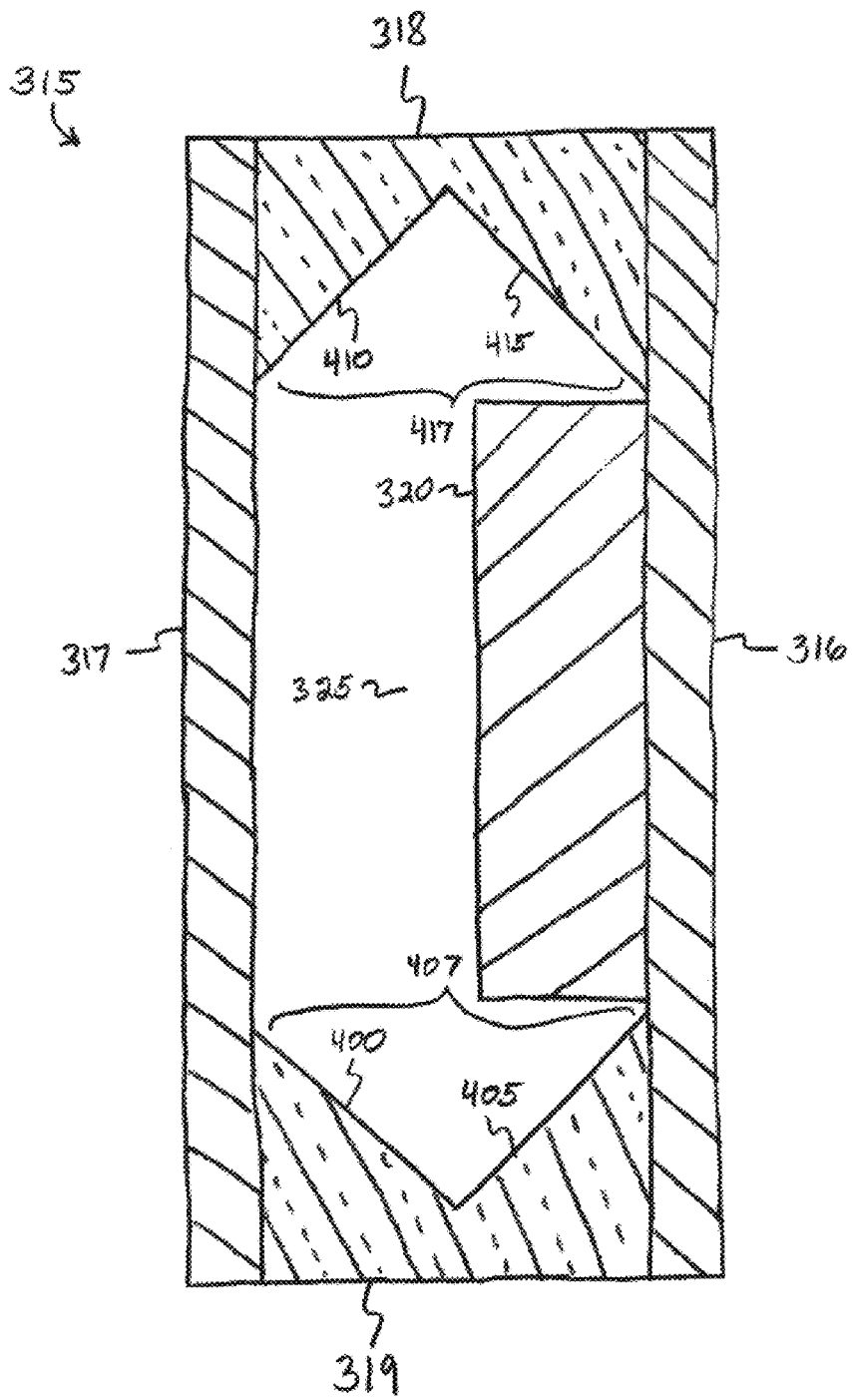
FIGS. 4, 5 and 8 are cross-sectional schematic diagrams of the element of FIG. 3.
Figure 7:
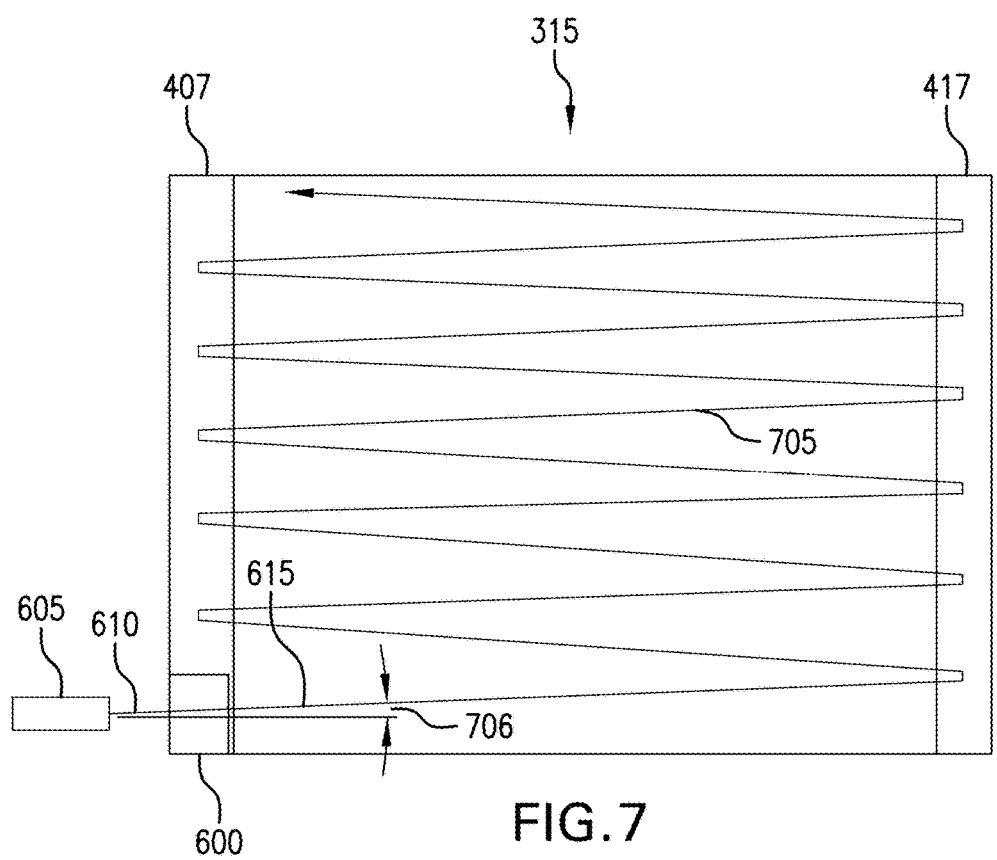

FIG. 3 shows a section plane 330, and FIG. 4 is a cross-sectional schematic diagram of the element 300, as viewed across the section plane 330. The body 315 includes two mirrors 400 and 405, collectively forming a first elongated retroreflector 407, and two additional mirrors 410 and 415 collectively forming a counterfacing second elongated retroreflector 417. The retroreflectors 407 and 417 are elongated parallel to a vertical axis 335, as shown in FIG. 3. The retroreflectors 407 and 417 have length axes 340 and 345, respectively, parallel to each other and parallel to the vertical axis 335. As used herein, the term "retroreflector" means a pair of mirrors or another arrangement that reflects light along an axis that is parallel, in at least two dimensions, to an incoming light axis. In some embodiments, a retroreflector includes a pair of planar mirrors, thereby permitting the light to be reflected in a third dimension, as discussed in more detail with reference to FIG. 7. In FIG. 7, the retroreflectors 407 and 417 create a helical path 705 that "walks up" the body 315. In some cases, the retroreflectors described herein, may be implemented with Porro mirrors or Porro prisms.

Figure 5:
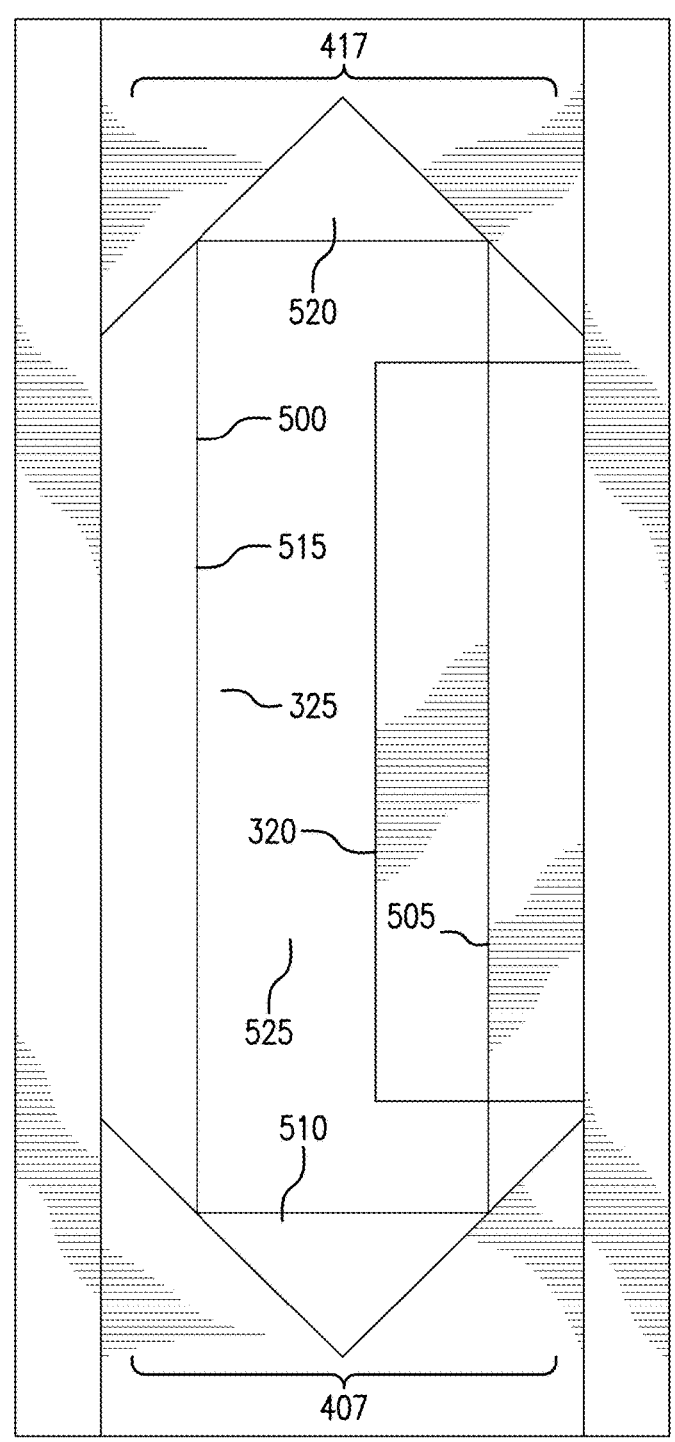

Although section lines in FIG. 4 indicate the retroreflectors 407 and 417, the first optical medium 320 and sides 420 and 425 of the body 315 are distinct materials or distinct parts, any combination of these parts may be fabricated as a whole. FIG. 5 is another cross-sectional view of the body 315 providing the same view as in FIG. 4, except FIG. 5 omits the section lines for clarity.

The retroreflectors 407 and 417 are disposed, relative to the first optical medium 320 and the void 325, to define a first optical circuit 500 between the first and second retroreflectors 407 and 417. The first optical circuit 500 includes legs 505, 510, 515 and 520. The first leg 505 is parallel to second leg 515. These legs 505 and 515 extend between the first and second retroreflectors 407 and 417. Leg 505 traverses the first optical medium 320, and leg 515 traverses the void 325, which contains the third optical medium. Collectively, the legs 505-520 bound a first area 525, as seen in the top view provided in FIGS. 4 and 5.

Figure 6:
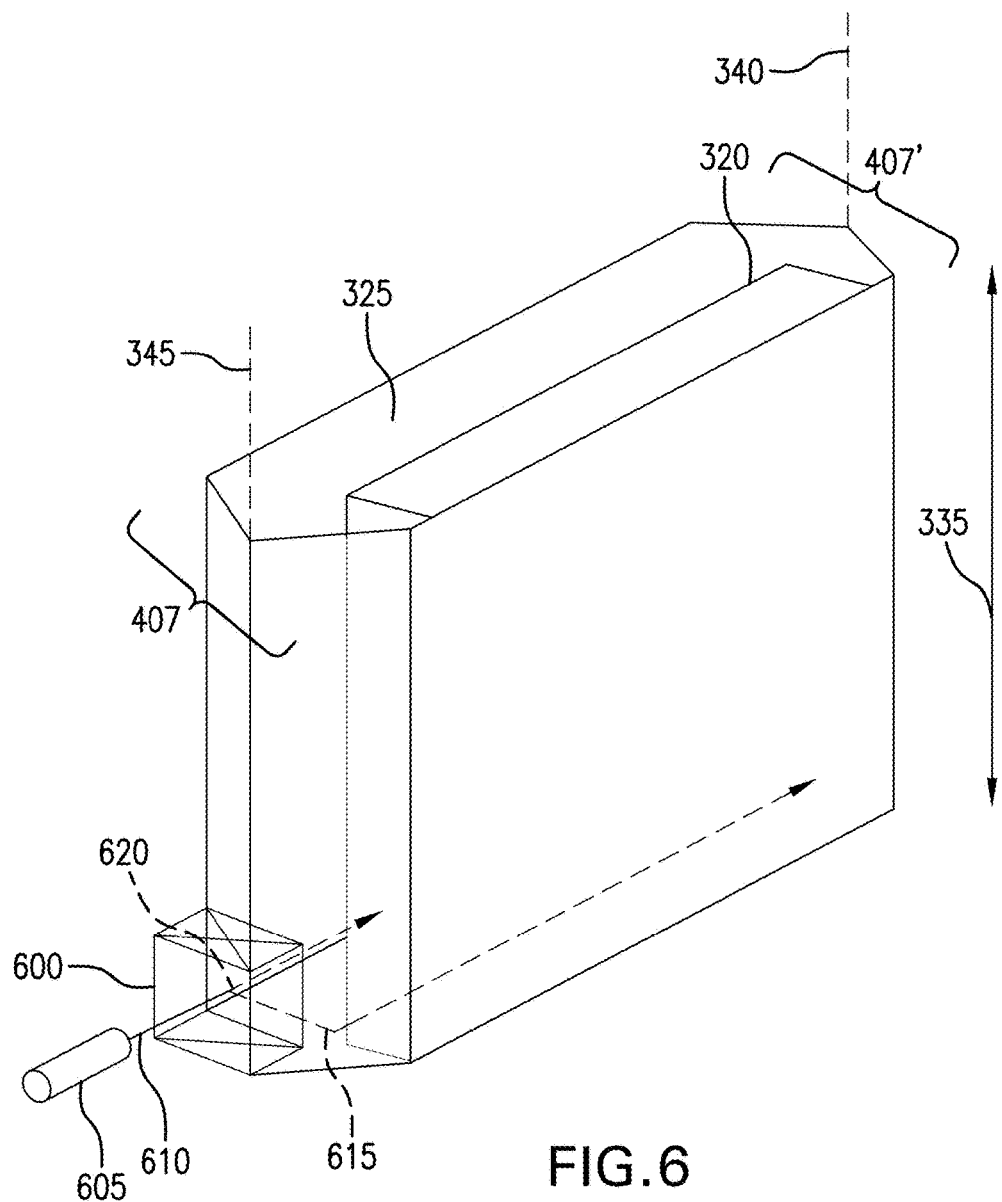
FIGS. 6 and 7 are perspective-view and side schematic diagrams, respectively, of a body of the element of FIG. 3.

FIG. 6 is a another perspective schematic diagram of the body 315 showing the outline of the void 325, faces of the retroreflectors 407 and 417 and the first optical medium 320. Other lines of the body 315 are omitted for clarity. A beam splitter 600 is disposed, relative to the void 325, the faces of the retroreflectors 407 and 417 and the first optical medium 320.

A light source 605 emits a light beam 610 into the beam splitter 600. The beam splitter 600 splits the light beam 610 into a first beam 615 and a second beam 620. The first beam 615 reflects from one surface of the retroreflector 407 and then enters the first optical medium 320. The second beam 620 passes through the beam splitter 600 and enters the third optical medium in the void 325.

Figure 8:
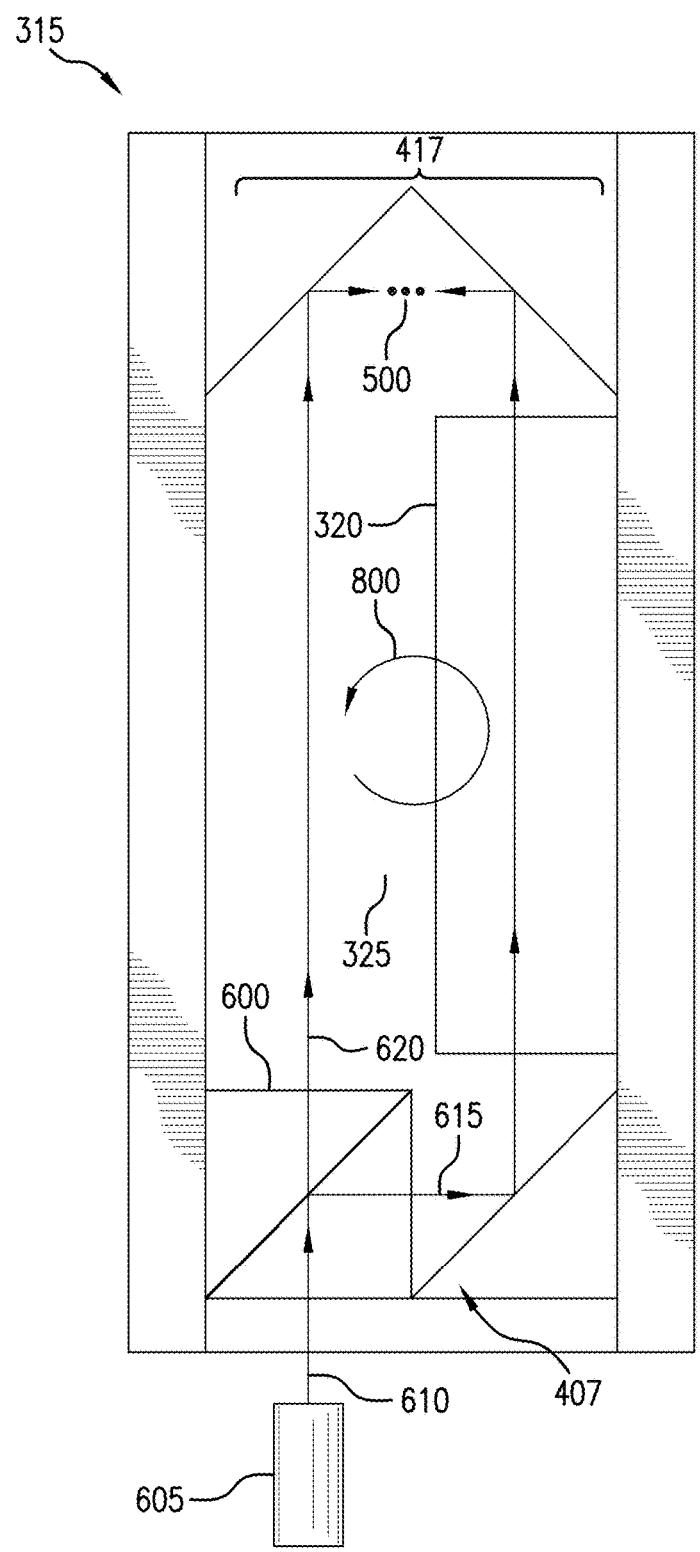

FIG. 7 is a side schematic diagram of the body 315. The boresight axis of the light source 605 is tilted at an angle 700, other than zero relative to horizontal. Therefore, the light beam 610 enters the beam splitter 600 at an angle, and the first and second beams 615 and 620 travel at angles, relative to horizontal. Only a path 700 of the first beam 615 is shown in FIG. 7 for clarity. When the first beam 615 reaches the second retroreflector 417, the first beam 615 is reflected at an angle, relative to horizontal, equal to the angle 700. Similarly, when the first beam 615 then reaches the first retroreflector 407, it is again reflected at an angle, relative to horizontal, equal to the angle 700. Thus, the first beam 615 follows a rectangular (as seen in top view) helical path 705 up (as seen in side view) the element 300. FIG. 8 is a top schematic view, similar to FIG. 5, but including the light source 605 and the beam splitter 600. The second beam 620 (not shown in FIG. 7) follows a similar rectangular (as seen in top view) helical path up the element 300, although the second beam 620 traverses the first optical circuit 500 in a direction opposite the first beam 615.

Because the angle of the light source 605 is other than zero, relative to horizontal, the angles of the light beams 615 and 620 are other than perpendicular, relative to the length axis 340 of the first retroreflector 407. Thus, the beam splitter 600 introduces the first and second beams 615 and 620 into first optical circuit 500 at respective first and second angles, other than perpendicular, to the length axis 345 of the first retroreflector 407. The first and second beams 615 and 620 traverse the first optical circuit 500 in opposite directions, as seen in the top view (FIG. 8), along respective rectangular helical paths. Each helical path includes a plurality of loops as the first and second beams 615 and 620 climb the element 300 (FIG. 7).

FIG. 8 is a top schematic view, similar to FIG. 5, but including the beam splitter 600 and light source 605. As can be seen in FIG. 8, the first beam 615 traverses the first optical path 500 in a generally counterclockwise direction, as indicated by arrow 800. The two beams 615 and 620 counter-rotate around the first optical circuit 500. That is, the first and second beams 615 and 620 traverse the first optical circuit 500 in opposite directions. Thus, the second beam 620 traverses the first optical path 500 in a generally clockwise direction.

Figure 9:
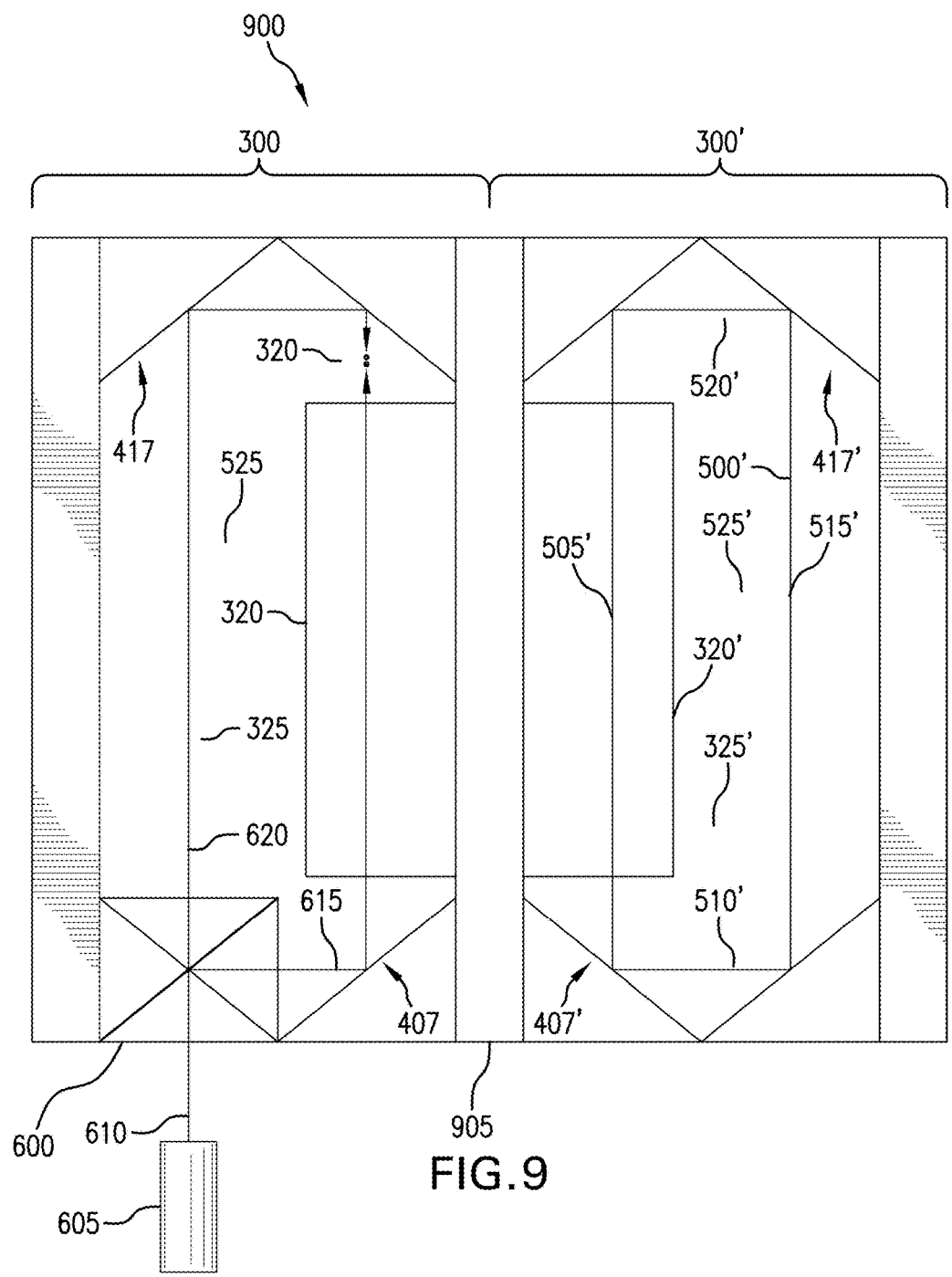
FIGS. 9, 10 and 11 are cross-sectional schematic diagrams of two side-by-side elements of FIG. 3 forming the vertical slab multi-pass optical accelerometer.

FIG. 9 is a top cross-sectional view of a vertical slab multi-pass optical accelerometer 900 that includes two side-by-side, largely mirror-image, elements 300 and 300'. Each of the elements 300 and 300' may be considered a "stack." The two elements 300 and 300' may share a common wall 905. The second element 300' includes third and fourth counterfacing elongated retroreflectors 407' and 417', a second optical medium 320' and it defines a second void 325' filled with a fourth optical medium. The second optical medium 320' may be in the form of a second right rectangular prism.

The third and fourth counterfacing elongated retroreflectors 407' and 417' have respective length axes parallel to the length axis 340 (FIG. 3) of the first retroreflector 407. The third and fourth counterfacing elongated retroreflectors 407' and 417' define a second optical circuit 500' between the third and fourth retroreflectors 407' and 417'. The second optical circuit 500' bounds a second area 525', as seen in a top view, equal in size to the first area 525 bounded by the first optical circuit 500. The second optical circuit 500' includes a third leg 505' and a fourth leg 515', each of which extends between the third and fourth retroreflectors 407' and 417'.

Figure 10:
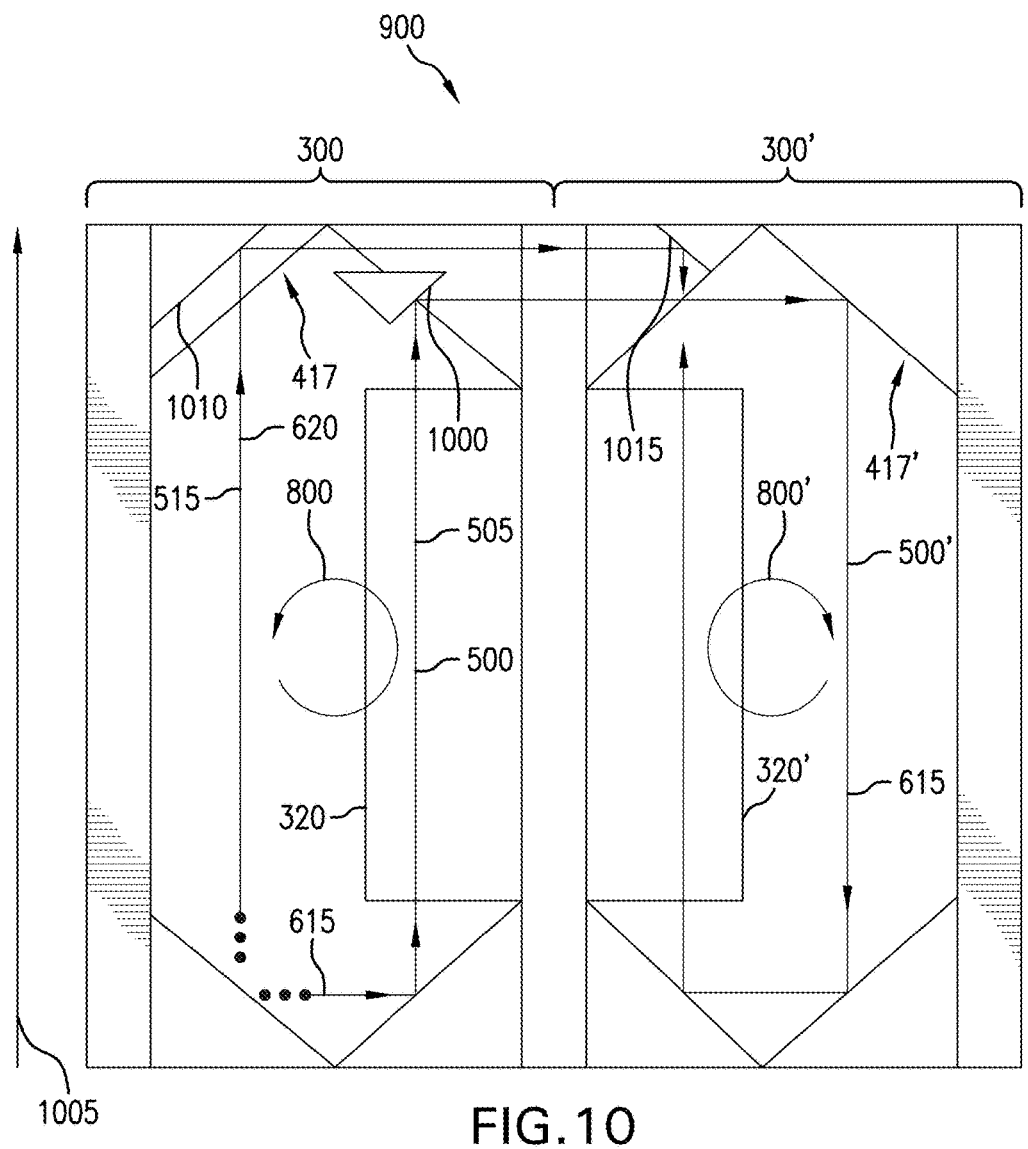

FIG. 10 is a top cross-sectional view similar to FIG. 9, but taken higher up the vertical slab multi-pass optical accelerometer 900. Above the top of the retroreflector 417 is a first stack coupling mirror 1000. The first stack coupling mirror 1000 is disposed in the first leg 505 to reflect the first beam 615 toward and into the second optical circuit 500'. As a result, the first beam 615 traverses the first and second optical circuits 500 and 500' in opposite directions, as seen in the top view and as indicated by arrows 800 and 800', along respective rectangular helical paths. Each helical path includes a plurality of loops. The number of loops in the first optical circuit 500 should equal the number of loops in the second optical circuit 500'. The first beam 615 traverses the first and second optical media 320 and 320' in equal directions and parallel to an input measurement axis 1005.

Also above the top of the retroreflector 417 in the first stack is a second stack coupling mirror 1010, and above the retroreflector 417' in the second stack is a third stack coupling mirror 1015. The second stack coupling mirror 1010 is disposed in the second leg 515. Collectively, the second and third stack coupling mirrors 1010 and 1015 reflect the second beam 620 toward and into the second optical circuit 500'. As a result, the second beam 620 traverses the first and second optical circuits 500 and 500' in opposite directions, as seen in the top view. Nevertheless, the second beam 620 traverses the first and second optical media 320 and 320' in equal directions and anti-parallel to the input measurement axis 1005.

The first and second optical media 320 and 320' may have substantially equal refractive indices and substantially equal lengths. As used herein, "substantially equal" refractive indices means the refractive indices do not differ by more than a relatively small fraction, such that any such difference does not contribute to more than about a few percent error. The first and second optical media 320 and 320' form measurement cells, as described with respect to the embodiment of FIGS. 1-2. Similarly, the third and fourth optical media in the voids 325 and 325' may have substantially equal refractive indices different from the refractive indices of the first and second optical media 320 and 320', and the third and fourth optical media in the voids 325 and 325' form reference cells, as described with respect to the embodiment of FIGS. 1-2. The optical media are disposed, respectively, in the first and second optical circuits 500 and 500', such that the first beam 615 traverses the first optical medium 320 and the third optical medium in opposite directions, and the first beam 615 traverses the second optical medium 325' and the fourth optical medium in opposite directions.

The stack coupling mirrors 1000, 1010 and 1015 are tilted downward (in side view) to reverse the upward helical path of the beams 615 and 620. Thus, in the second element 300', the first beam 615 follows a rectangular (as seen in top view)

helical path down (as seen in side view) the second element 300', analogous to the way the first beam 615 follows a rectangular helical path up the first element 300, as described with reference to FIG. 7. The second beam follows a similar rectangular (as seen in top view) helical path down the second element 300', although the second beam 620 traverses the second optical circuit 500' in a direction opposite the first beam 615.

Figure 11:
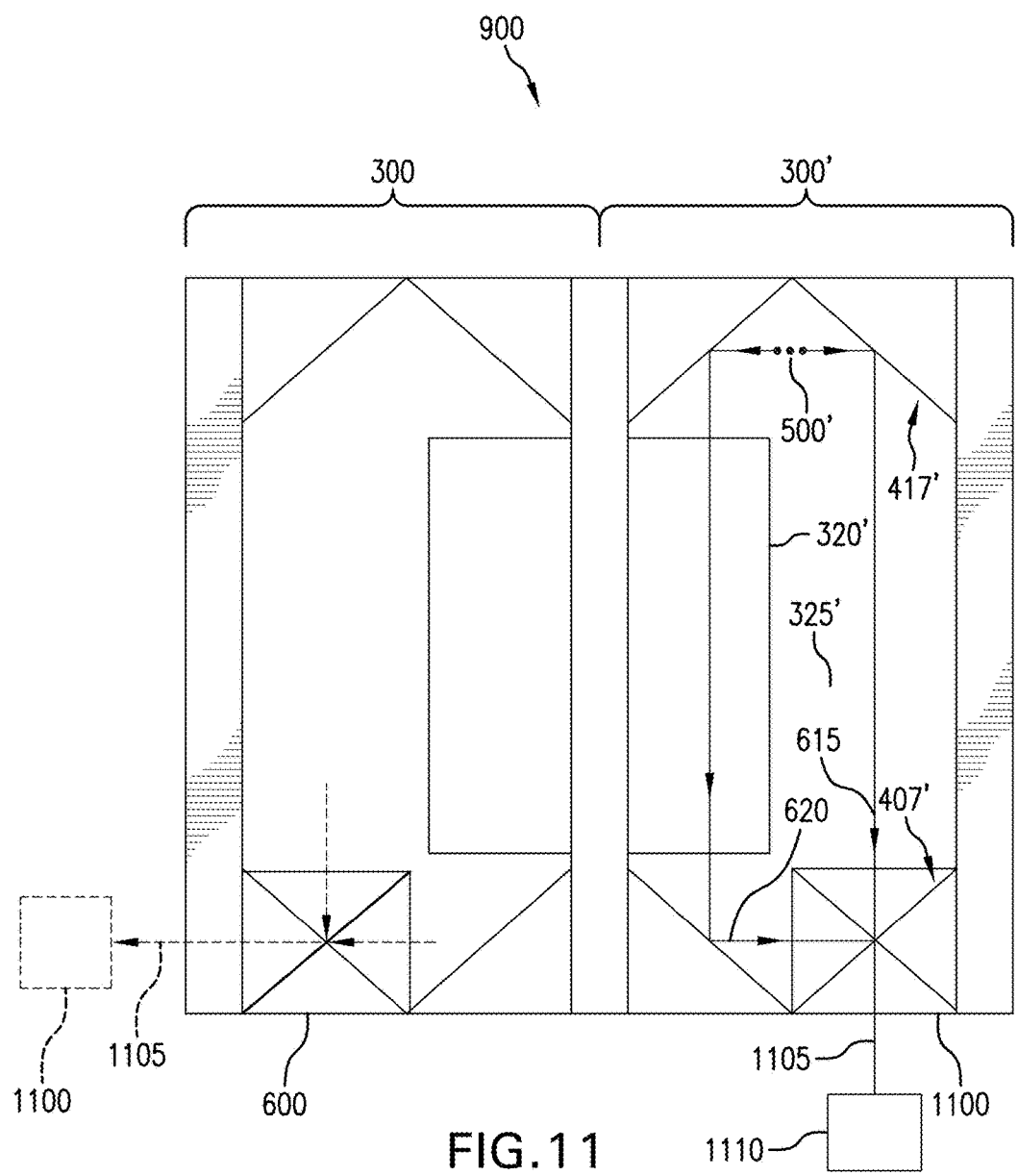
Figure 12:
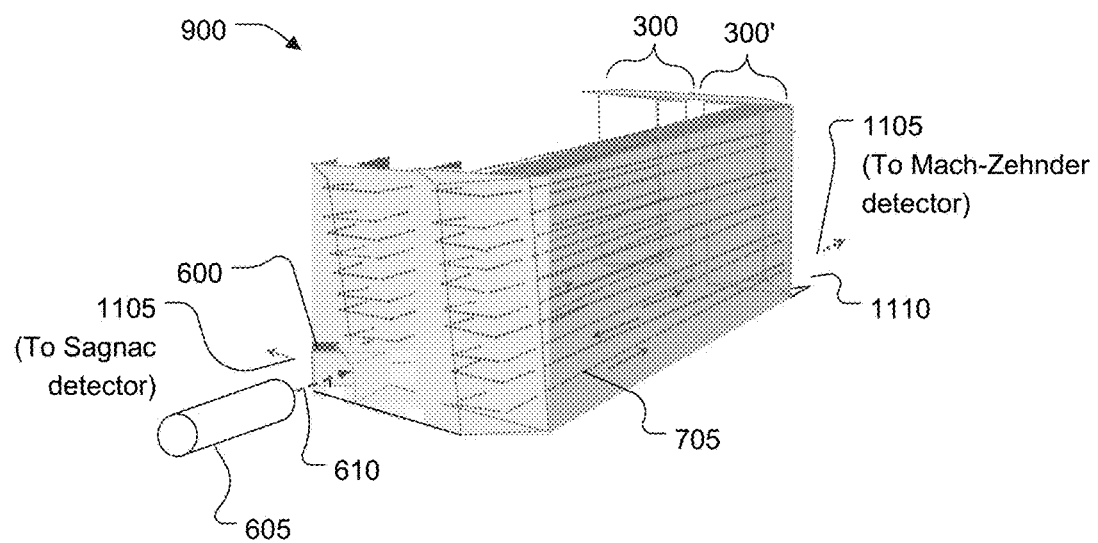
FIG. 12 is a perspective schematic diagram of the vertical slab multi-pass optical accelerometer of FIGS. 9-11.

FIG. 11 is a top cross-sectional view similar to FIG. 10, but taken lower down the vertical slab multi-pass optical accelerometer 900. A beam combiner 1100 is disposed, relative to the void 325', the faces of the retroreflectors 407' and 417' and the second optical medium 320'. The beam combiner 1100 combines the first and second beams 615 and 620 to produce an output signal 1105 from interference between the first and second beams 615 and 620, after the first and second beams 615 and 620 have traversed the plurality of loops in the first and second optical circuits 500 and 500'. A sensor 1110 receives the output signal 1105 to detect the interference. FIG. 12 is a perspective schematic diagram of the vertical slab multi-pass optical accelerometer 900.

As shown and described, the beam combiner 1100 is optically coupled to the second optical circuit 500' at a far point, along the first and second optical circuits 500 and 500', from the beam splitter 600 (FIGS. 6 and 8) in a Mach-Zehnder configuration. Alternatively, the optical accelerometer 900 may include first and second reversing mirrors disposed in the second optical circuit 500' instead of the beam combiner 1100. The first and second reversing mirrors may be disposed at angles complementary to the first angle 700 (FIG. 7), relative to the length axis 340 of the first retroreflector 407, to reflect the first and second beams 615 and 620, respectively. In this case, the beam splitter 600 (FIGS. 6-9) may also act as a beam combiner, in a Sagnac configuration, as indicate by dashed lines in FIG. 11.

For illustrative purposes, the refractive index of each of the first and second optical media 325 and 325' may be at least about 1.3, and the refractive index of each of the third and fourth optical media may be at most about 1.002. As noted with respect to the embodiment described with reference to FIGS. 1-2, optical media with other indices of refraction may be used, as long as the index of refraction of the first optical medium 325 is different from the index of refraction of the third optical medium, and the index of refraction of the second optical medium 325' is different from the index of refraction of the fourth optical medium. Also, as noted, sensitivity ("gain") depends in part on the difference between the indices of refraction in the measurement cell and the reference cell.

The first optical medium 325 may include glass. The second optical medium 325' may include glass. The third optical medium may include a first chamber containing a medium, such air, partial or complete vacuum or at least 99% nitrogen. The fourth optical medium may include a second chamber containing a medium as selected for the first chamber.

As discussed in relation to the embodiment of FIGS. 1 and 2, the optical accelerometer 900 can operate in either a frequency-tracking accelerometer mode, analogous to an IFOG, or in the integrated Δ-velocity mode, analogous to a PIGA. A good combination of features may be obtained by operating in a combined mode, with anti-reflection coatings along most of the height of both sides of the measurement cell optical medium 320, operating in the integrated Δ-velocity mode for increased sensitivity and a narrow band of high-reflection coatings on both sides above the retroreflector 407' at the beam combiner 1100 to concentrate the first and second beams 615 and 620 to make their capture easier.

Figures 13, 14:
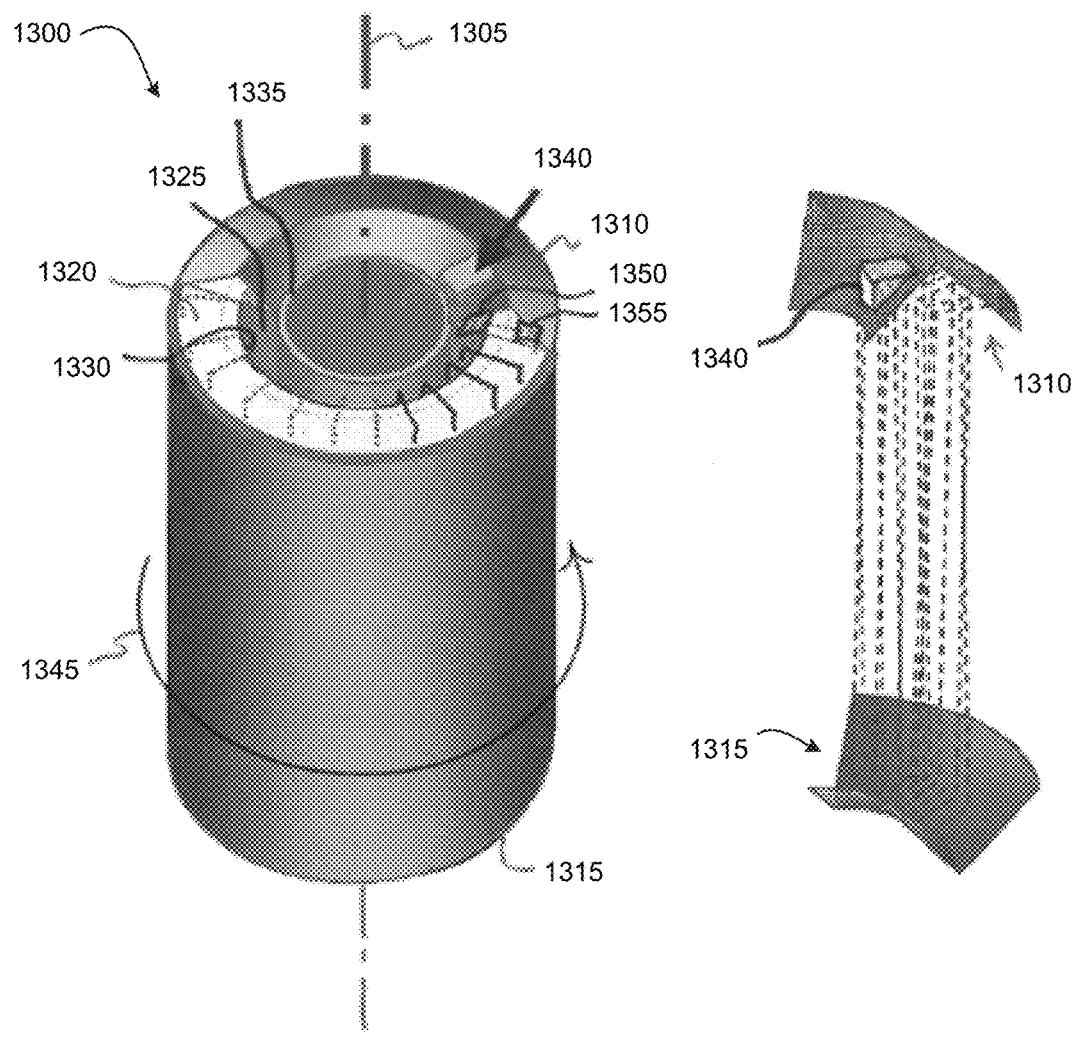
FIG. 13 is a cut-away perspective schematic diagram of a toroidal optical accelerometer, according to another embodiment of the present invention.
FIG. 14 is a cut-away portion of the toroidal optical accelerometer of FIG. 13 illustrating retroreflectors thereof, according to an embodiment of the present invention.
Figure 15:
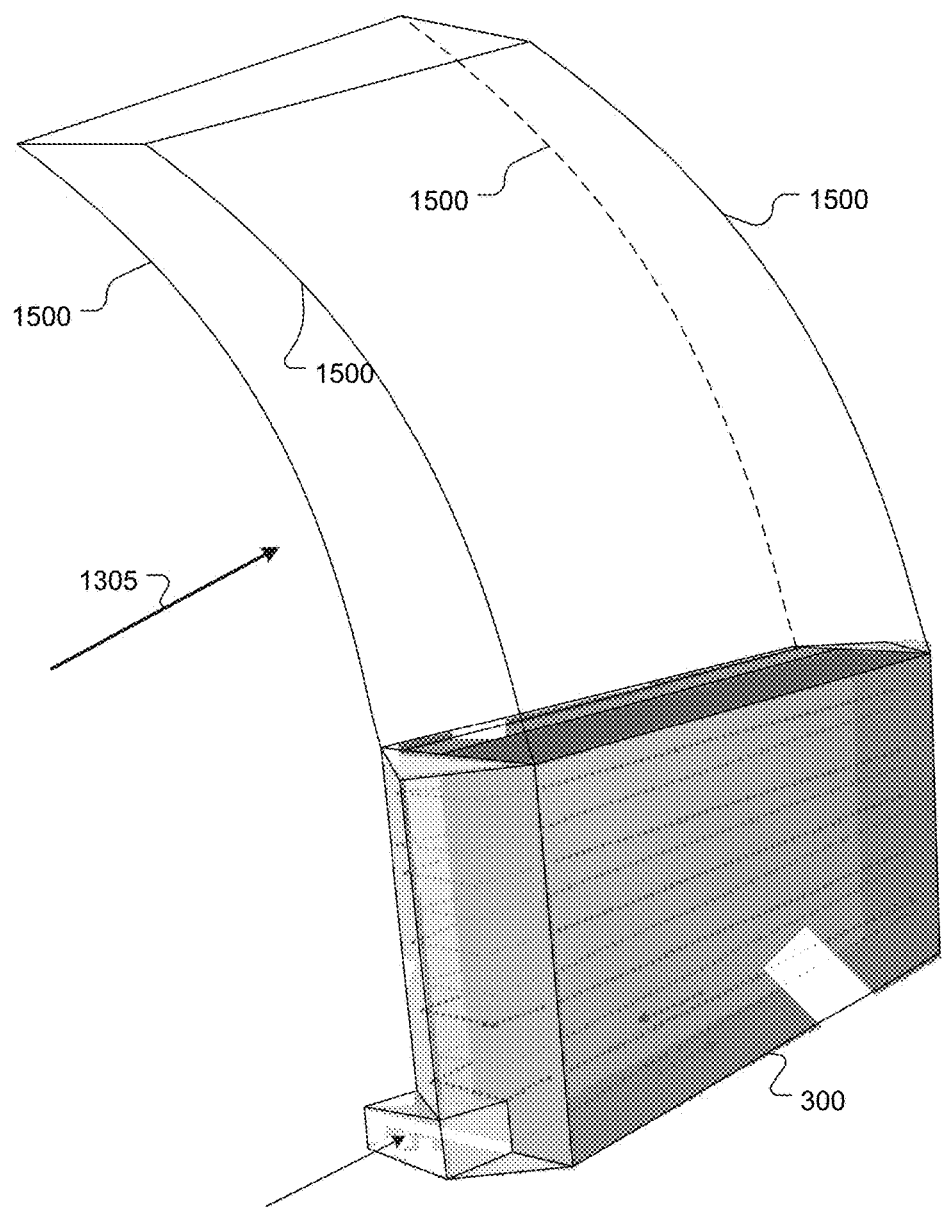
FIG. 15 is a perspective schematic diagram of an element of the toroidal optical accelerometer of FIG. 13, curved to wrap it about an input axis.

FIG. 13 is a cut-away perspective schematic diagram of a toroidal optical accelerometer 1300, according to another embodiment of the present invention. The toroidal optical accelerometer includes a special case interferometer. Essentially, the optical accelerometer 1300 includes an element 300, as described with reference to FIGS. 3-8, wrapped about an input axis 1305. FIG. 15 is a perspective schematic diagram of the element 300, similar to FIG. 6, indicating by extension lines 1500 how the element 300 is curved to wrap it about the input axis 1305. Returning to FIG. 13, the toroidal optical accelerometer 1300 includes counter-facing first and second retroreflectors 1310 and 1315, as shown in more detail in FIG. 14. The first and second counterfacing toroidal retroreflectors 1310 and 1315 have their toroidal centers disposed on the input measurement axis 1305.

A toroidal first optical medium 1320 acts as a measurement cell and surrounds a toroidal void 1325 filled with a second optical medium, such as a partial or complete vacuum, air, dry nitrogen or another suitable optical medium, which acts as a reference cell. An inside wall 1330 of the first optical medium 1320 and an outside wall of a tube 1335 define sides of the void 1325. Consequently, the second optical medium takes on a toroidal shape. The toroidal first optical medium 1320, the toroidal void 1325, the toroidal second optical medium and the tube 1335 are coaxial about the input axis 1305. End caps, such as provided by the first and second retroreflectors 1310 and 1315, may define ends of the void 1325.

The first toroidal optical medium 1320 is disposed between the first and second counterfacing toroidal retroreflectors 1310 and 1315. The first toroidal optical medium 1320 has a first refractive index. The second toroidal optical medium has a second refractive index, different from the first refractive index. The second toroidal optical medium is disposed between the first and second counterfacing toroidal retroreflectors 1310 and 1315.

Figures 16, 17:
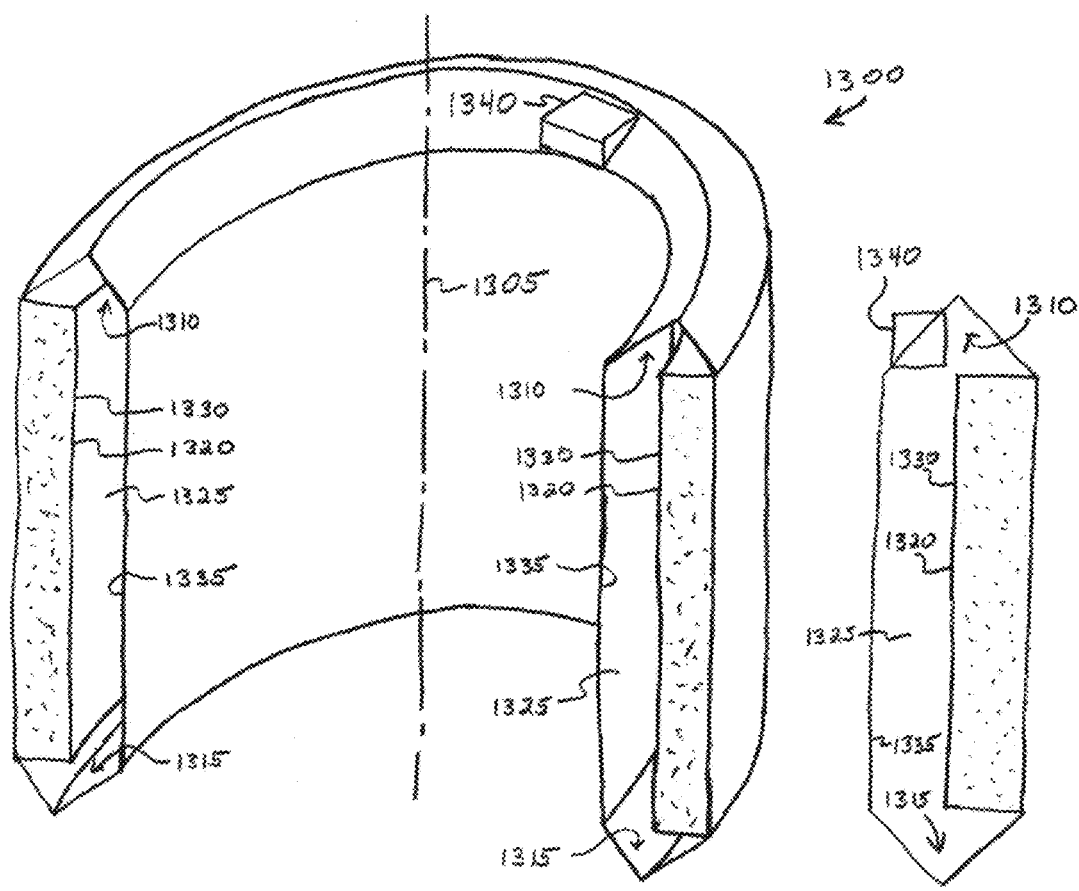
FIG. 16 is another cut-away view of the toroidal optical accelerometer of FIGS. 13-15.
FIG. 17 is a cross-sectional view of the toroidal optical accelerometer taken through a beam splitter thereof.

A beam splitter 1340 splits an input light beam from a light source (not visible) into two beams, as described with reference to FIG. 6. FIG. 16 is a cut-away view of the optical accelerometer 1300, and FIG. 17 is a cross-sectional view of the optical accelerometer 1300 taken through the beam splitter 1340. FIGS. 18 and 19 schematically illustrate paths taken by portions of the two beams 1900 and 1905. One beam 1905 initially traverses the first optical medium 1320, and the other beam 1900 initially traverses the optical medium in the void 1325. When the beams 1900 and 1905 emerge from the first and second optical media, respectively, they are reflected by the second retroreflector 1315, as described with reference to FIG. 8. Thus, the two beams 1900 and 1905 counter-rotate the optical circuit that includes the two optical media. The first beam 1900 traverses the circuit in a generally clockwise direction, as indicated by arrow 1910, and the second beam 1905 traverses the circuit in a generally counterclockwise direction.

The input light beam is introduced at an angle, other than zero, relative to the input axis 1305, as described with reference to FIG. 7. Therefore, the two light beams 1900 and 1905 traverse legs between the two retroreflectors 1310 and 1315 that are nearly, but not exactly, parallel to the input axis 1305. Consequentially, as the two beams 1900 and 1905 reflect between the two retroreflectors 1310 and 1315, they advance circumferentially around the toroidal optical accelerometer 1300, as indicated by an arrow 1345.

This advance is illustrated in FIG. 18, which shows only the second beam 1905. For example, in a first leg 1800, the beam 1905 travels down through the void 1325 to the second retroreflector 1315, which reflects the beam 1905 so it travels in a second leg 1805 up through the first optical medium 1320. However, because the beam 1905 is not exactly parallel to the input axis 1305, at the end of the first leg 1800, when the beam 1905 is reflected by the first half of the retroreflector 1315, the beam 1905 is reflected not exactly radially outward, as shown at 1810. Consequently, the beam 1905 advances circumferentially, in the direction of the arrow 1345. Each subsequent reflection by each of the retroreflectors 1310 and 1315, such as at 1815, 1820, 1825 and 1830, further advances the beam 1905 circumferentially, in the direction of the arrow 1345. Although not shown in FIG. 18, the other beam 1900 is similarly reflected by the retroreflectors 1310 and 1315 to advance circumferentially around the optical accelerometer 1300 in the direction of the arrow 1345. For purposes of illustration, the angles are exaggerated in FIG. 18.

In one embodiment, the beam splitter 1340 or a separate beam combiner (not shown) recombines the two beams 1900 and 1905, once the two beams 1900 and 1905 have traveled around the circumference of the toroidal optical accelerometer 1300. In another embodiment, as shown in FIG. 13, reversing mirrors 1350 and 1355 reflect the two beams 1900 and 1905, respectively, back along their paths to reverse the direction 1345 in which the two beams advance circumferentially around the toroidal optical accelerometer 1300, and the beam splitter 1340 or a separate beam combiner (not shown) recombines the two beams, once the two beams have traveled back from the reversing mirrors 1350 and 1355.

An electronic circuit (not shown) may be disposed within the tube 1335 or separately situated. The electronic circuit may be coupled to the light source and to a light sensor (not shown) coupled to an output of the beam splitter 1340 or beam combiner, as the case may be. The electronic circuit may drive the light source, such as modulating the light source as desired. The electronic circuit may analyze signals from the sensor to calculate acceleration along the input axis 1305 experienced by the toroidal optical accelerometer 1300. The electronic circuit may include a processor executing instructions, stored in a memory, to control the light source and/or to analyze the signals from the sensor and/or to calculate the acceleration.

The toroidal optical accelerometer 1300 is compact and inherently insensitive to constant angular velocity Sagnac effects about the input axis 1305. If the two beams are reversed by the reversing mirrors 1350 and 1355, the toroidal optical accelerometer 1300 is also insensitive to Sagnac angular acceleration effects. Although the toroidal optical accelerometer 1300 is shown in FIGS. 13-19 as having the measurement cell radially outside the reference cell, these cells may be interchanged. For example an outer tube (not shown) may define an outer boundary of the reference cell, and the outside surface of the measurement cell may define an inner boundary of the reference cell.

FIG. 20 is a plan schematic diagram, and FIG. 21 is a left side schematic diagram, of a planar waveguide optical accelerometer 2000 having an input axis 2002, according to another embodiment of the present invention. The planar waveguide optical accelerometer includes a special case interferometer.

The optical accelerometer 2000 is constructed on a suitable substrate 2004, such as Zerodur® glass. Alternating glass and vacuum, air or dry nitrogen waveguides are deposited or constructed on the substrate 2004. Representative glass waveguides, which serve as measurement cells, are shown at 2006, 2008, 2010 and 2012. Representative vacuum waveguides, which serve as reference cells, are shown at 2014, 2016, 2018 and 2020. The vacuum waveguides may be defined by sides of the glass waveguides 2006-2012, the substrate 2004 and a lid 2100, which may also be made of the same material as the substrate 2004. Reflective cladding may be applied to surfaces of the waveguides 2006-2020 to constrain light beams within the waveguides and counteract beam divergence.

The substrate 2004 may be electromachined to define retroreflectors at ends of each pair of waveguides, as exemplified by retroreflectors 2022 and 2024. Optionally or alternatively, the retroreflectors 2022-2024 may be implemented as photonic crystals. For example, two-dimensional photonic crystals may be made by photolithography, or by drilling holes in the substrate 2004, as shown in FIG. 22. Representative holes are indicated at 2200.

An input light beam 2026 is divided by a beam splitter 2028 into two light beams 2030 and 2032 that traverse the planar waveguide optical accelerometer 2000 as indicated in FIG. 20. A beam combiner 2034 combines the two beams 2030 and 2032 to produce an output light beam 2036. As indicated by an arrow 2038, the first light beam 2030 traverses the measurement/reference cells in a generally clockwise direction, whereas the second beam 2032 traverses the measurement/reference cells in a generally counterclockwise direction, as indicated by an arrow 2040.

In an example embodiment, a single about 4×6 cm device (dimensions 2042 and 2044) is sufficient to provide a nominal phase-change read-out sensitivity of about 1 (rad/sec)/g, with losses of about 1 dB. In some embodiments, the substrate 2004 is about 500 μl thick, the lid 2100 is about 100 μl thick and the waveguides 2006-2020 are each about 10 μl high. The planar waveguide optical accelerometer 2000 may be fabricated using conventional semiconductor MEMS fabrication techniques. For example, grooves may be etched in the substrate 2004. Half the grooves may be filled with optical glass, such as by vapor deposition, and the remaining grooves may be filled with dry gas or a partial vacuum.

Several substrates, each as described with respect to the substrate 2004, may be layered together. Instead of a beam combiner 2034, each layer except the last layer includes a photonic coupler to an immediately adjacent layer. Only the last layer includes the beam splitter 2028.

Figure 23:
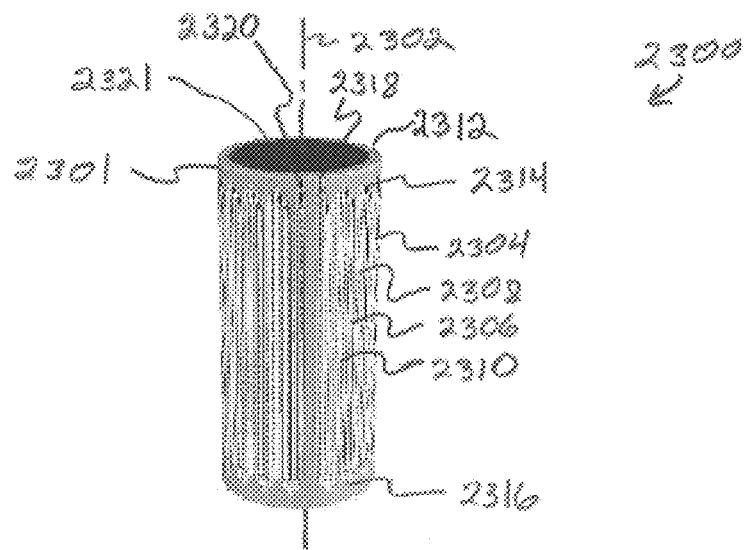
FIG. 23 is a perspective schematic illustration of a cylindrical waveguide optical accelerometer, according to an embodiment of the present invention.

FIG. 23 is a perspective schematic illustration of a cylindrical waveguide optical accelerometer 2300, according to an embodiment of the present invention. The cylindrical waveguide optical accelerometer includes a special case interferometer. The cylindrical waveguide optical accelerometer 2300 may be formed by wrapping the planar waveguide optical accelerometer 2000, described with reference to FIGS. 20-22, into a cylinder 2301 about an input axis 2302. Alternating measurement cells and reference cells, represented by measurement cells 2304 and 2306 and reference cells 2308 and 2310, are disposed parallel to the input axis 2302 and about an outer surface of a substrate 2312. The substrate 2312 may be any suitable material, such as Zerodur® glass.

A cylindrical lid (not shown for clarity), which may be made of the same material as the substrate 2312 or of a different suitable material, covers the measurement and reference cells 2304-2310. retroreflectors, represented by retroreflectors 2314 and 2316, are disposed at ends of pairs of the cells 2304-2310, as discussed with reference to FIG. 20. A beam splitter 2318 and a beam combiner 2320 are disposed are respective ends of two of the cells.

As with the toroidal optical accelerometer 1300 described with reference to FIGS. 13-19, an electronic circuit (not visible) may be disposed within a space 2321 defined by the cylinder 2301 or separately situated. The electronic circuit may be coupled to a light source and to a light sensor (not shown) respectively coupled to the beam splitter 2318 and to the beam combiner 2320. The electronic circuit may drive the light source, such as modulating the light source as desired. The electronic circuit may analyze signals from the sensor to calculate acceleration along the input axis 2302 experienced by the cylindrical waveguide optical accelerometer 2300.

Figure 24:
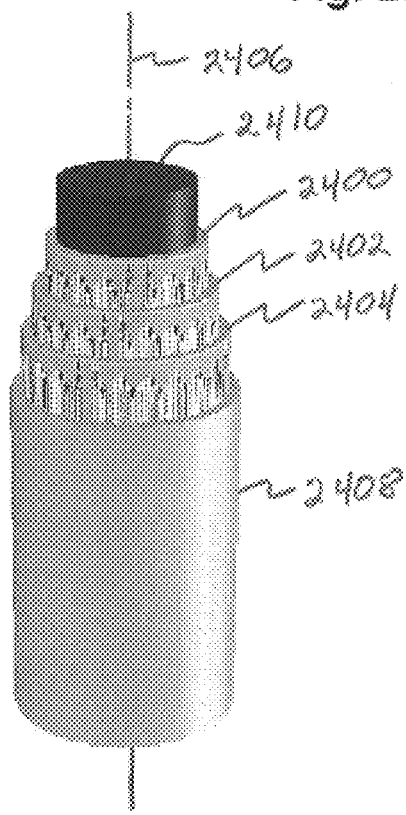
FIGS. 24 and 25 are perspective schematic illustrations of a nested cylindrical waveguide optical accelerometer that includes several coaxial cylinders, each similar to the cylinder of FIG. 24, according to another embodiment of the present invention.
Figure 25:
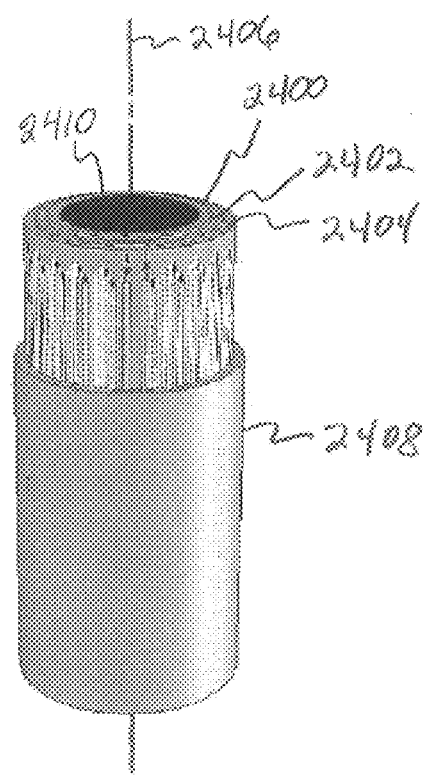

As shown in FIG. 24, several cylinders, represented by cylinders 2400, 2402 and 2404, each similar to the cylinder 2301 (FIG. 23), may be nested coaxially about an input axis 2406. The outer cylinder 2404 may be covered by a cylindrical lid 2408. The nested cylinders 2400-2404 are shown exploded along the input axis 2406 in FIG. 24 and collapsed into a compact cylindrical form in FIG. 25.

Each cylinder 2402-2404 defines a light path that traverses the measurement and reference cells of the cylinder. The light paths of intermediate cylinders 2402-2404 are optically coupled to light paths in immediately adjacent cylinders to form a single optical path extending serially from the beginning of outer most cylinder 2404 (not counting the lid 2408) to the end of the inner most cylinder 2400. This long optical path provides increased gain over that available from a single cylinder.

As with the cylindrical waveguide optical accelerometer 2300 described with reference to FIG. 24, an electronic circuit (not visible) may be disposed within a space 2410 defined by the inner most cylinder 2400 or separately situated. The electronic circuit may be coupled to a light source and to a light sensor (not shown) respectively coupled to a beam splitter in the outer most cylinder 2404 (alternatively, the inner most cylinder 2400) and to a beam combiner in the inner most cylinder 2400 (alternatively, the outer most cylinder 2404). The electronic circuit may drive the light source, such as modulating the light source as desired. The electronic circuit may analyze signals from the sensor to calculate acceleration along the input axis 2406 experienced by the nested cylindrical waveguide optical accelerometer.

Figure 26:
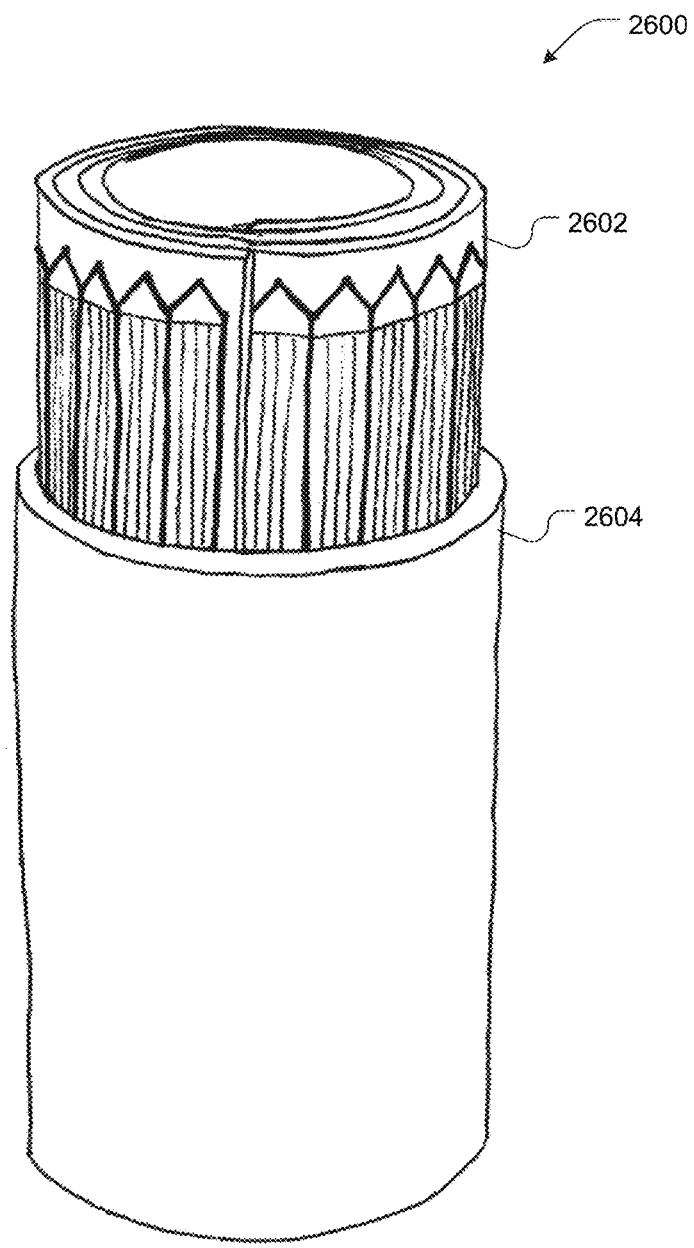
FIG. 26 is a perspective schematic illustration of a spiral-wound waveguide optical accelerometer 2600, according to yet another embodiment of the present invention.

FIG. 26 is a perspective schematic illustration of a spiral-wound waveguide optical accelerometer 2600, according to another embodiment of the present invention. The optical accelerometer 2600 is similar to the optical accelerometer 2300, except a single substrate 2602 is spiral wound and disposed within a cylindrical lid 2604. Advantages of the spiral-wound optical accelerator 2600 include obviating a need to optically couple a plurality of coaxial substrates.

Figure 27:
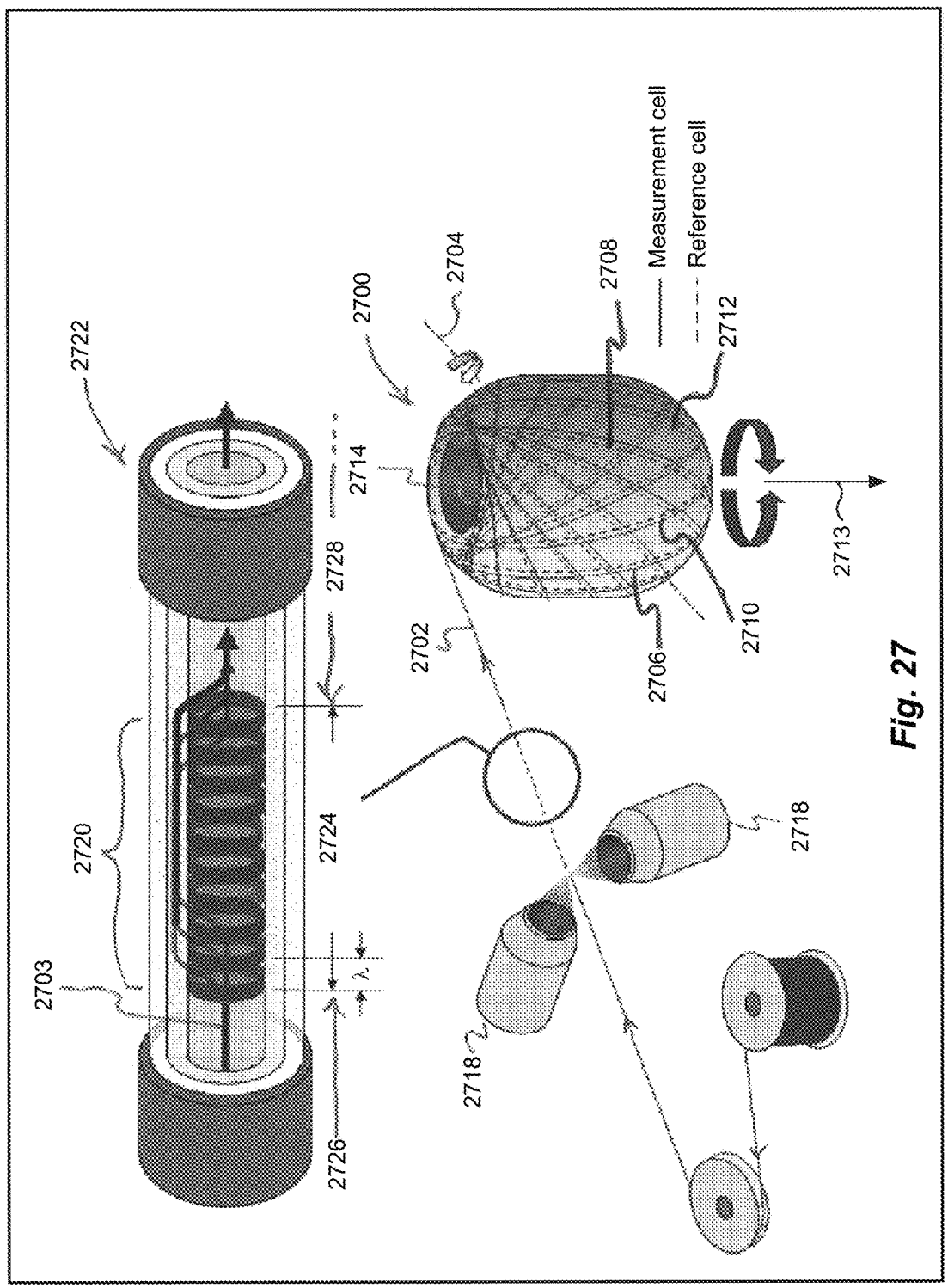
FIG. 27 is a perspective schematic illustration of a fiber optic accelerometer according to another embodiment of the present invention.

As described herein, various embodiments of optical accelerometers include measurement cells and reference cells, in which the measurement cells have different indices of refraction than the reference cells, and optical paths are defined such that two light beams traverse the measurement and reference cells in opposite directions. FIG. 27 is a perspective schematic illustration of a fiber optic accelerometer 2700 according to yet another embodiment of the present invention. The fiber optic accelerometer includes a special case interferometer.

An optical fiber 2702 is wound much like a diagonally-wound ball of twine. The ball is wound circumferentially about an axis 2704. The optical fiber 2702 forms a coil and conducts a light beam 2703. The optical fiber 2702 is prepared ahead of time, or while the ball is wound, so as to form half-winding pairs of the optical fiber 2702, such as half-winding pair 2706 and 2708 and half-winding pair 2710 and 2712, where the light beam 2703 is conducted by one half-winding of each pair and then immediately by the other half-winding of the pair. Each half-winding of each pair conducts the light beam 2703 in a direction opposite that of the other half-winding of the pair, relative to an input axis 2713.

One half-winding of each pair has a different index of refraction than the other half-winding of the pair. One half-winding, indicated by a solid line, of each pair forms a measurement cell, and the other half-winding, indicated by a dashed line, of the pair forms a reference cell. A winding direction reversal mid-way through the optical fiber coil winding, indicated as 2714, so that one half of the coil may be wound in a generally clockwise direction about the axis 2713, while the other half may be wound generally counter-clockwise about the axis 2713, as shown by the two curved arrows around axis 2713, provides a zero-area Sagnac rotation compensation.

Such an optical fiber 2702 may be made of double-clad optical fiber that is irradiated by a laser 2718 to form double-clad long-period fiber Bragg gratings (DLFBG), represented by DLFBG 2720, to change the index of refraction of the fiber along its length, within the extent of the DLFBG, on alternate half-windings of the optical fiber, in particular, on the measurement cells. To form the DLFBG, the irradiation may include one wavelength or a plurality of wavelengths. The irradiation intensity may be constant or varied. The irradiation may be performed using one or a plurality of lasers. The laser may be a focused pulsed laser. The optical fiber may be irradiated, to form the DLFBG, while the optical fiber is being wound. Also, the irradiation of optical fiber may be performed separately from winding the optical fiber, in any order. A portion 2722 of the optical fiber 2702 is shown in FIG. 27. A length 2724 of the optical fiber 2702 equals approximately one-half the circumference (one-half winding) of the ball. Note that the circumference of the ball increases as the ball is wound.

The length 2724 of the optical fiber 2702 is treated, at one-half the circumference intervals, by the laser 2718 to form the DLFBG to form the measurement cells. All the measurement cells need not be the same length. Adjacent lengths 2726 and 2728, which are each approximately one-half the circumference long, are untreated by the laser 2718, forming respective reference cells.

Figure 28:
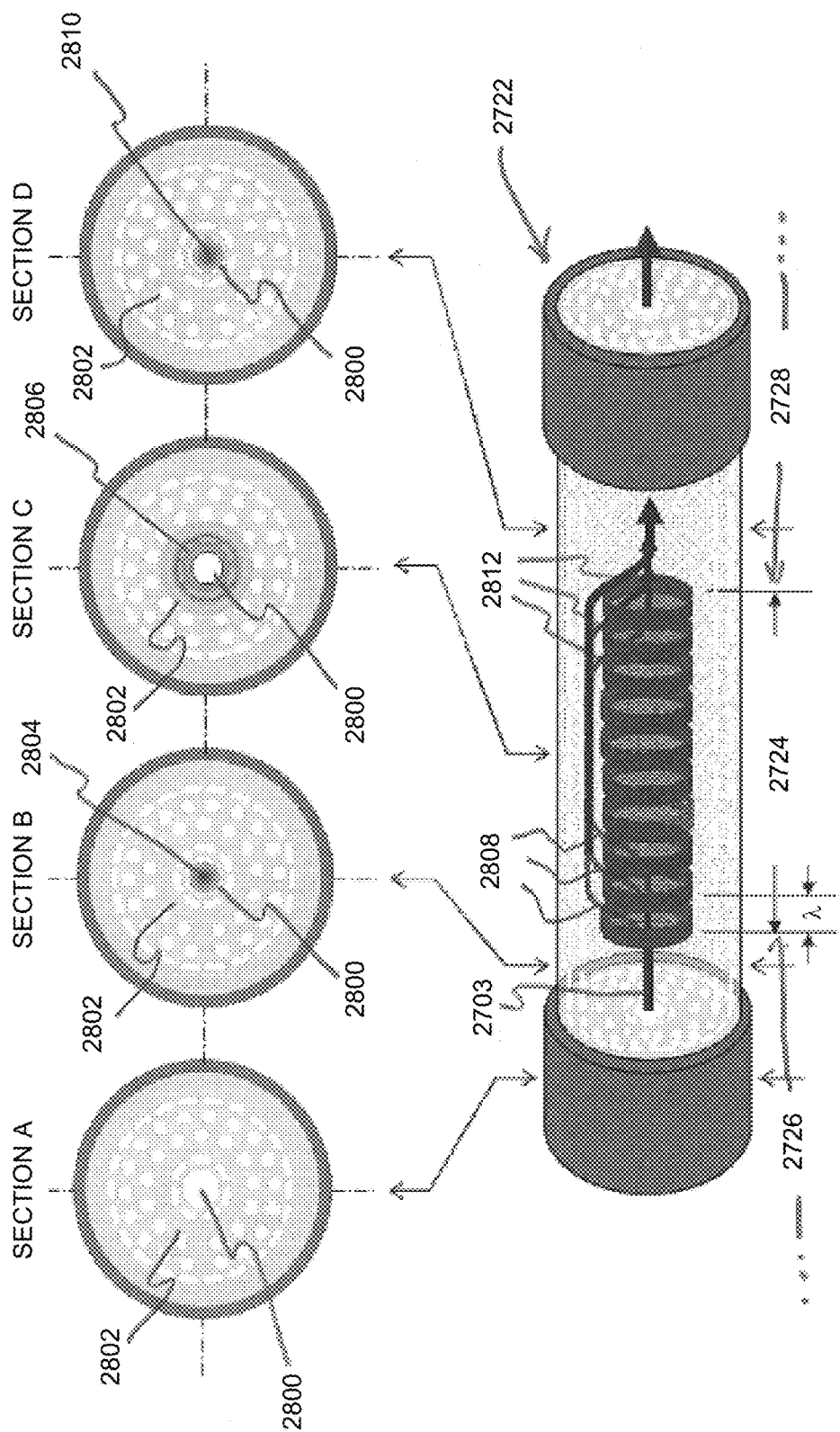
FIG. 28 schematically illustrates a same portion of an optical fiber, as well as schematically illustrating four cross-sections of the optical fiber, of the fiber optic accelerometer of FIG. 27.

FIG. 28 schematically illustrates the same portion 2722 of the optical fiber 2702, as well as schematically illustrating four cross-sections of the optical fiber 2702. Section A shows an air core 2800 and cladding 2802 of the optical fiber 2702. As shown in Section B, in the reference cell 2726, the light 2804 is conducted along the air core 2800. However, as shown in Section C, the DLFBG of the measurement cell causes the light 2806 to switch from the air core 2800 to the cladding 2802, as indicated by arrows at 2808. As shown in Section D, once the light exits the measurement cell 2724, the light 2810 switches back to the air core 2800, as indicated by arrows 2812.

The cladding 2802 has a higher index of refraction than the air core 2800. Therefore, as the light beam 2703 traverses the measurement cells, the light beam experiences a higher index of refraction than when the light beam traverses the reference cells. The portions of the optical fiber 2702 that have the first index of refraction are contiguous with subsequent adjacent portions of the optical fiber with the second index of refraction. Similarly, the portions of the optical fiber 2702 that have the second index of refraction are contiguous with subsequent adjacent portions of the optical fiber with the first index of refraction, i.e., there are no splices between adjacent portions with different indices of refraction. Other aspects of the fiber optic accelerometer 2700 operate according to the principles discussed herein.

Instrument describing equations for phase shift and frequency shift are presented for two independent methods: by integration of the phase shift around the beam path; and by use of the relativistic velocity addition formula. Dispersion terms have been neglected, as monochromatic laser illumination is assumed, and dispersion effects will cancel out, as has been shown by [13]. Both methods give identical results, which are consistent with published results of studies of other related devices. Exemplary calculations follow.

In 1967, Post [1] calculated the phase integral of the electromagnetic fields of a laser gyro's light beams about the gyro's closed path by integration by parts, applies Stokes's theorem to equate this to the rotational flux through the path's enclosed area, and then demonstrated the method on gyro and interferometer beams imbedded in static and constant velocity media. Post [1], Eq. (46), gives the phase shift, in fractional wavelengths, for a contra-rotating beam Sagnac interferometer and refractive medium moving together at a uniform velocity, as:

$$\Delta Z = \frac{2}{C\lambda_0} \oint n^2 (1-\alpha) \overline{V} \cdot \overline{ds}, \text{ where } \alpha = (1 - 1/n^2) \quad (1)$$

When coupled with the accessory condition that $\delta\omega=0$, this leads to:

$$\Delta Z = \frac{2}{C\lambda_0} \oint \overline{V} \cdot \overline{ds} \quad (2)$$

and the well-known conclusion [13] that the phase shift in a Sagnac interferometer in constant rotation, to first order, is independent of the characteristics of the medium, dependent only upon the area of the closed path and the rotational field through it, and is unaffected by uniform translation.

Under acceleration, however, with separate beams passing through different media, the conditions are different. Once a light beam is launched from the source, the photon phase velocity in vacuum is independent of the source velocity, and is constant at $3\times10^8$ m/sec, while the photon frequency is Doppler shifted by the moving source, whether accelerating or at constant velocity. At constant velocity, this is compensated for by an identical and opposite shift at the detector. Under acceleration, the integrated acceleration of the detector during the photon's transit to the detector results in a differential velocity between source & detector, causing an additional Doppler effect at the detector. However, in a two beam Mach-Zehnder interferometer these will be identical in the reference and measurement beams and will thus also be compensated for. The Doppler effects of differential velocity due to acceleration of each medium's entering & leaving interfaces are second order, and can be absorbed into the device scale factor.

What remains is the change in interaction between the constant vacuum velocity photon beams with the atoms of the measurement and reference cells, due to the change in kinetic energy and momentum of the atoms under acceleration, resulting in additional frequency and integrated phase shifts in each beam. If the indices of refraction of the mediums the beams pass through are equal, there will be no net interferometer output, but if they are unequal, there will be a net change in the output, proportional to the acceleration. (In a transparent medium, the momentum and energy transfer from the photon beam to the medium is very small (the definition of "transparent"), relative to the momentum and energy transfer from the moving medium to the photon beam.)

As this is the only remaining effect of acceleration on this device, the frequency and phase shift for an accelerating medium in an accelerating Mach-Zehnder interferometer in vacuum will be the same as for an accelerating medium in a static Mach-Zehnder interferometer in vacuum, and the discussion of Post [1], Section IV-D and equation [1-(55)] are appropriate, with velocity, V, replaced with the integrated acceleration, $\Delta V$, The phase shift becomes:

$$\Delta Z = \frac{2}{C\lambda_0} \oint (n^2 \alpha) \Delta \overline{V} \cdot \overline{ds}$$

which is equivalent to: (3)

$$\Delta Z = \frac{2}{C\lambda_0} \oint (1 - n^2) \Delta \overline{V} \cdot \overline{ds}$$

For the interferometer with figure-8 loops of equal loops of FIGS. 1 and 2, accelerating from one uniform velocity field, $V_1$, ($|V_1|\ll C$), to another, $V_2$, ($|V_2|\ll C$), where $\Delta V = (V_2 - V_1) \cdot IA$, the path length can be broken into three parts:

1. The two loops, imbedded in media of equal and uniform indices of refraction, excluding the measurement and reference cells. The path length in the forward and backward velocity directions are equal, so, excluding the possibility of non-reciprocal effects due to birefringence or polarization, the path integral of these segments and their contribution to the resultant phase shift will be 0.

2. The phase shift contribution due to the total path integral for counter-rotating beams through both of the measurement cells, assuming their index of refraction ($n_m$) is uniform and equal, and they are of equal length (L), is:

$$\Delta Z_m = \frac{2}{C\lambda_0}(2L(1-n_m^2)\Delta V \quad (4)$$

3. Similarly, because the acceleration direction through both the reference cells is reversed for a translating interferometer relative to the beam direction for a rotating interferometer, their phase shift contribution, again assuming their index of refraction ($n_r$) is uniform and equal, and they are of equal length to the measurement cells (L), is:

$$\Delta Z_r = \frac{-2}{C\lambda_0}(2L(1-n_r^2)\Delta V \quad (5)$$

If $n_r$ is the same as that of the underlying structure excluding the measurement and reference cells (e.g., $n_r=1$, vacuum) the length of the reference cell will automatically be the same as that of the measurement cell without the need for partitioning off a separate cell.

The sum of the phase shift contributions is thus:

$$\Delta Z = \frac{4L}{C\lambda_0}(n_r^2 - n_m^2)\Delta V, \text{ \{wavelengths, (with } \Delta V \text{ in m/sec)\}} \quad (6)$$

Note that if the reference cells are vacuum (if the reference cell medium is vacuum, that leg, as well as the underlying structure is unaffected by acceleration (see also Footnote 5)), this reduces to:

$$\Delta Z_0 = \frac{4L}{C\lambda_0}(1 - n_m^2)\Delta V, \text{ \{wavelengths, (with } \Delta V \text{ in m/sec)\}} \quad (7)$$

Or, in scale factor form:

$$\frac{\Delta Z}{\Delta V} = \frac{4L}{C\lambda_0}(n_r^2 - n_m^2), \text{ and } \frac{\Delta Z_0}{\Delta V} = \frac{4L}{C\lambda_0}(1 - n_m^2) \quad (8)$$

{wavelengths, (with $\Delta V$ in m/sec)}

The equivalent expression for a single pass through a single layer of the vertical slab interferometer with counter-rotating beams of FIG. 3, as shown in FIG. 8, is:

$$\frac{\Delta Z}{\Delta V} = \frac{2L}{C\lambda_0}(n_r^2 - n_m^2), \text{ and } \frac{\Delta Z_0}{\Delta V} = \frac{2L}{C\lambda_0}(1 - n_m^2) \quad (8a)$$

{wavelengths, (with $\Delta V$ in m/sec)}

Consider a single pass through one layer of the Mach-Zehnder interferometer of FIGS. 6-8, excited by a fixed frequency source, $f_0 = \omega_0/2\pi$, at rest in a local inertial frame, $V_0$, with index of refraction of the reference cell, $n_r$, and of the measurement cell, $n_m$.

The two paths followed by the first and second beams 120 and 125 are identical, but reversed, and are imbedded in media of equal and uniform indices of refraction, excluding the measurement and reference cells. The path length of the two beams are nominally equal so, excluding the possibility of second-order non-reciprocal effects due to birefringence or polarization, their contributions to the resultant phase shift measured at the beam combiner 1100, other than that due to the differing indices of refraction of the measurement and reference cells, will nominally be zero.

The speed of light through the reference cells is $u_r = C/n_r$, and through the measurement cells, $u_m = C/n_m$. The corresponding transit times through cells of length, L are $\tau_r = L(n_r/C)$ and $\tau_m = L(n_m/C)$.

The phase shift across each cell, respectively, is then $\phi_r = f_0\tau_r$ and $\phi_m = f_0\tau_m$ and the phase shift across the interferometer is: the difference of the sums of the phase shifts of the measurement cells 135 and 150 and reference cells 140 and 160.

$$\Delta\varphi = f_0(\tau_r - \tau_m) = \frac{2L}{\lambda_0}(n_r - n_m) \quad (9)$$

This is the phase shift in an unbalanced Mach-Zehnder interferometer due to dielectric cells of different index of refraction in a uniform inertial reference frame at constant, (arbitrary) velocity. As above, this phase shift is either mechanically adjusted to 0, or measured and recorded as a reference for the future.

A useful equivalent form is:

$$\Delta\varphi\left(\frac{C \cdot 2L}{\lambda_0}\right)\left(\frac{n_r}{C} - \frac{n_m}{C}\right) = \quad (10)$$

-continued $$\frac{C \cdot 2L}{\lambda_0}\left(\frac{1}{u_r} - \frac{1}{u_m}\right)\Delta\varphi \frac{C \cdot 2L}{\lambda_0}\left(\frac{n_r}{C} - \frac{n_m}{C}\right) = \frac{C \cdot 2L}{\lambda_0}\left(\frac{1}{u_r} - \frac{1}{u_m}\right)$$

The interferometer is now uniformly accelerated parallel to the Input Axis over a period of time to a new velocity, $V_1$, where $\Delta V = V_1 - V_0$. Through relativistic velocity addition [14-(53)], the velocity of light within the reference cell medium, with parameters as measured in the original reference frame [15], becomes:

$$u_r' = \frac{dx_r'}{dt'} = \frac{u_r - \Delta V}{1 - \frac{\Delta V \cdot u_r}{C^2}} = \frac{\frac{C}{n_r} - \Delta V}{1 - \frac{\Delta V}{C^2} \cdot \frac{C}{n_r}} = \frac{\frac{C}{n_r} \cdot \left(1 - \frac{\Delta V \cdot n_r}{C}\right)}{1 - \frac{\Delta V}{n_r \cdot C}} \quad (11)$$

$$\frac{1}{u_r'} = \frac{n_r}{C}\cdot\left(1 - \frac{\Delta V}{n_r \cdot C}\right)\cdot\left(1 - \frac{\Delta V \cdot n_r}{C}\right)^{-1} =$$
$$\frac{n_r}{C}\cdot\left(1 - \frac{\Delta V}{n_r \cdot C}\right)\cdot\left(1 + \frac{\Delta V \cdot n_r}{C} + \ldots \blacksquare \frac{\Box}{C^2}\right) \quad (12)$$

Neglecting higher order terms than $\Delta V/C^2$:

$$\frac{1}{u_r'} = \frac{n_r}{C}\cdot\left(1 - \frac{\Delta V}{n_r \cdot C} + \frac{\Delta V \cdot n_r}{C}\right) = \frac{n_r}{C} + \frac{\Delta V}{C^2}(n_r^2 - 1) \quad (13)$$

Similarly: (14)

$$\frac{1}{u_m'} = \frac{n_m}{C} + \frac{\Delta V}{C^2}(n_m^2 - 1)$$

Inserting (13) and (14) into (10) gives:

$$\Delta\varphi = \frac{C \cdot 2L}{\lambda_0}\cdot\left(\frac{n_r - n_m}{C} + \frac{\Delta V}{C^2}\cdot(n_r^2 - n_m^2)\right) = \quad (15)$$

$$\underbrace{\frac{2L}{\lambda_0}\cdot(n_r - n_m)}_{\text{Static},=\varphi_0} + \underbrace{\frac{\Delta V \cdot 2L}{\lambda \cdot C}\cdot(n_r^2 - n_m^2)}_{\text{Dynamic},=(\varphi_1 - \varphi_0)} = \Delta Z_0$$

The first ("Static") term in Eq. (15) is identical to Eq. (9), the interferometer's phase shift at $V_0$, the original reference velocity, and the second ("Dynamic") term is the additional phase shift in the accelerated frame due to the change in velocity $\Delta V$ (the Fizeau drag term), identical in form to Eq. (6). This second term is the output of a split-beam, single layer, figure-8 configured, Mach-Zehnder integrating accelerometer with a non-vacuum Reference Cell that has been adjusted for 0 phase shift in the reference (launch) frame.

From Eq. (13), the index of refraction and velocity of propagation in the accelerated frame, to the first order in $\Delta V$, is:

$$\frac{C}{u_{V1}} = n_{V1} = \left(n_{V0} + (n_{V0}^2 - 1)\cdot\left(\frac{\Delta V}{C}\right)\right) \quad (16)$$

and $$u_{V1} = \left(u_{V0} - \left(1 - \frac{1}{n_{V0}^2}\right)\cdot(\Delta V)\right) \quad (17)$$

Through a rearrangement of terms, (16) can be shown to be identical to equation (13) of [16], for a reversal of direction, $V = -\Delta V$:

$$n' = \frac{n + (V/C)}{|1 + n(V/C)|} \quad [16\text{-}(13)]$$

Assume a pair of contra-rotating beams passing through a single layer of the layered-loop vertical slab interferometer of FIG. 3 with the following nominal parameter values: L=2 inches=5E−2 m, C=3E8 m/sec, $\lambda_0$=1.55E−6 m, $n_m$=1.46 (Infrasil 301 optical glass), $n_r$=1 (vacuum). In this case, there is one measurement cell and reference cell, so the scale factor in the integrated Δ-velocity mode is:

$$S.F._{(\Delta V)} = \frac{\Delta Z_0}{\Delta V} = \frac{2L}{\lambda_0 C}(1 - n_m^2) = \frac{2 \times 5 \cdot 10^{-2}}{1.55 \cdot 10^{-6} \times 3 \cdot 10^8}(1 - 2.13) = -2.43 \cdot 10^{-4} \quad (37a,b)$$

{Wavelengths/(m/sec), or 1.53 mrad/(m/sec ΔV), per layer}

For a bulk optics instrument with contra-rotating beams, a 0.5 deg. (8 mrad) tilted entrance beam gives an 0.08 cm rise of successive beam layers over a 2×5 cm path length, for 12.5 passes/cm, or 19 mrad/(m/sec ΔV) per cm height. (Consistent with currently available laser source free-space beam divergence. Greater divergence may require a correspondingly greater rise between successive beams, corrective figuring to the surfaces of the measurement cell, or a measurement cell composed of planar wave guides, as in FIG. 20, aligned fiber-optic bundles, or ruled gratings, to capture and control the light beam.)

To provide a nominal read-out sensitivity of 1 (rad/sec)/g, equivalent to 0.1 (rad)/(m/sec ΔV), with Sagnac effect immunity for a device with the example dimensions requires about 66 layers, or a stacked pair of instrument blocks about 2.7 cm high, as in FIG. 12. Different dimensions will provide different performance.

As another example, the concentric toroidal configuration of FIGS. 13-19, with tilted input beams to provide multiple passes for increased gain, has an integrated Δ-velocity mode scale factor of:

$$\frac{\Delta Z_T}{\Delta V} = \frac{4\pi L}{C \lambda_0}\left(\frac{\pi D}{s}\right)(n_r^2 - n_m^2) \text{ rad}/(\text{m/sec}) \quad (38)$$

where πD/s is the number of turns around the toroid perimeter and s is the separation between spiral loops.

Using the same 0.08 cm separation (s) between spiral loops as above, a nominal 4.4 cm diameter (D) of the toroid, and a nominal 5 cm cell length (L), provides 170 spiral passes for a single circuit around the toroid, for a one-way Δ-velocity mode instrument scale factor of 260 mrad/(m/sec ΔV).

While specific parameter values may be recited for disclosed embodiments, within the scope of the invention, the values of all of parameters may vary over wide ranges to suit different applications. While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. Equations may be rearranged to generate equivalent results. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable non-transitory storage media (e.g., read-only memory devices within a computer, such as ROM, or devices readable by a computer I/O attachment, such as CD-ROM or DVD disks), information alterably stored on tangible writable non-transitory storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A multi-pass optical system for interferometrically sensing acceleration, comprising:
    first and second counterfacing toroidal retroreflectors, centered along a measurement axis, cooperating to (a) steer a first light beam along a first helical optical path having a plurality of rectangular loops, and (b) steer a second light beam along a second helical optical path having a plurality of rectangular loops, the first and second helical optical paths having opposite helicities and advancing circumferentially in the same direction around the measurement axis;
    a first toroidal optical medium having a first refractive index and positioned (a) between the first and second counterfacing retroreflectors and (b) coaxially with the measurement axis, such that a first leg of each rectangular loop of each helical optical path coincides with the first toroidal optical medium; and
    a second toroidal optical medium having a second refractive index different from the first refractive index, and positioned (a) between the first and second counterfacing retroreflectors and (b) coaxially with the measurement axis, such that a second leg of each rectangular loop of each helical optical path coincides with the second toroidal optical medium;

wherein the first and second toroidal optical media induce, according to an acceleration along the measurement axis, first and second optical phase shifts onto the first and second light beams, respectively, values of the first and second phase shifts being equal in magnitude and opposite in sign.

2. The optical system of claim 1, further comprising a beam splitter positioned to split an input light beam into the first and second light beams, and steer the first and second light beams into the first and second optical paths, respectively.

3. The optical system of claim 2, further comprising a beam combiner positioned to combine the first and second light beams after traversing the respective first and second optical paths.

4. The optical system of claim 3, further comprising a light sensor for detecting interference between the combined first and second light beams.

5. The optical system of claim 4, further comprising an electronic circuit electrically coupled to the light sensor for receiving an output signal of the light sensor and generating an acceleration signal based on the output signal.

6. The optical system of claim 2, further comprising:
first and second turning mirrors cooperating to (a) reflect the first light beam into a first reflected light beam that traverses the second optical path oppositely to the second light beam, and (b) reflect the second light beam into a second reflected light beam that traverses the first optical path oppositely to the first light beam;
wherein the first and second toroidal optical media induce, according to the acceleration along the measurement axis, the first and second optical phase shifts onto the first and second reflected light beams, respectively; and
wherein the system (a) induces onto the first light beam and the first reflected light beam a first Sagnac optical phase shift, and (b) induces onto the second light beam and the second reflected light beam a second Sagnac optical phase shift equal to the first Sagnac optical phase shift.

7. The optical system of claim 6, wherein the beam splitter is configured to combine the first and second reflected light beams after traversing the second and first optical paths, respectively.

8. The optical system of claim 7, further comprising a light sensor for detecting interference between the first and second reflected light beams after being combined by the beam splitter.

9. The optical system of claim 8, further comprising an electronic circuit electrically coupled to the light sensor to receive an output signal of the light sensor and generate an acceleration signal based on the output signal.

10. The optical system of claim 9, wherein the electronic circuit is positioned (a) within an inner radius of the second toroidal optical medium, and (b) between the counterfacing retroreflectors.

11. A method for interferometrically sensing acceleration, comprising:
steering a first light beam along a first helical optical path having a plurality of rectangular loops, and a second light beam along a second helical optical path having a plurality of rectangular loops, the first and second helical optical paths having opposite helicities and advancing circumferentially in the same direction around a measurement axis, a first leg of each rectangular loop of each helical optical path coinciding with a first optical medium having a first refractive index, and a second leg of each rectangular loop of each helical optical path coinciding with a second optical medium having a second refractive index different from the first refractive index;
measuring a phase difference between (a) a first optical phase shift induced on the first light beam by the first and second optical media according to an acceleration of the optical media along the measurement axis, and (b) a second optical phase shift induced on the second light beam by the first and second optical media according to the acceleration, values of the first and second optical phase shifts being equal in magnitude and opposite in sign.

12. The method of claim 11, further comprising splitting an input beam into the first and second light beams.

13. The method of claim 12, further comprising combining the first and second light beams after traversing the first and second optical paths, respectively.

14. The method of claim 13, measuring a phase difference comprising sensing interference between the first and second light beams, after combining.

15. The method of claim 14, further comprising generating an acceleration signal based on the sensed interference.

16. The method of claim 12, further comprising:
reflecting the first light beam, after traversing the first optical path, into a first reflected light beam that traverses the second optical path oppositely to the second light beam; and
reflecting the second light beam, after traversing the second optical path, into a second reflected light beam that traverses that first optical path oppositely to the first light beam.

17. The method of claim 16, further comprising combining the first and second reflected light beams after traversing the second and first optical paths, respectively.

18. The method of claim 17, measuring a phase difference comprising sensing interference between the first and second light beams, after combining.

19. The method of claim 18, further comprising generating an acceleration signal based on the sensed interference.

* * * * *